United States Patent
Choi et al.

(10) Patent No.: US 9,116,392 B2
(45) Date of Patent: Aug. 25, 2015

(54) LIQUID CRYSTAL DISPLAY

(75) Inventors: Min Oh Choi, Asan-si (KR); Hee Wook Do, Cheonan-si (KR); Duckjong Suh, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 675 days.

(21) Appl. No.: 13/437,562

(22) Filed: Apr. 2, 2012

(65) Prior Publication Data

US 2013/0021562 A1    Jan. 24, 2013

(30) Foreign Application Priority Data

Jul. 22, 2011  (KR) .................. 10-2011-0073287

(51) Int. Cl.
  *G02F 1/1335*  (2006.01)
  *G02F 1/13363*  (2006.01)
(52) U.S. Cl.
  CPC ...... *G02F 1/133634* (2013.01); *G02F 2201/50* (2013.01); *G02F 2413/02* (2013.01); *G02F 2413/08* (2013.01); *G02F 2413/13* (2013.01)
(58) Field of Classification Search
  USPC ...................... 349/96–98, 117–121
  See application file for complete search history.

(56) References Cited

U.S. PATENT DOCUMENTS

| | | | |
|---|---|---|---|
| 7,808,592 B2* | 10/2010 | Ohmuro et al. | 349/117 |
| 7,872,716 B2* | 1/2011 | Nagai | 349/119 |
| 2005/0157225 A1* | 7/2005 | Toyooka et al. | 349/99 |
| 2009/0115944 A1* | 5/2009 | Jeon et al. | 349/96 |
| 2009/0268136 A1* | 10/2009 | Palto | 349/118 |

FOREIGN PATENT DOCUMENTS

| | | |
|---|---|---|
| JP | 2713184 | 2/1998 |
| JP | 2007-183584 | 7/2007 |
| JP | 2010-224512 | 10/2010 |
| KR | 10-2010-0069964 | 6/2010 |

* cited by examiner

*Primary Examiner* — Richard Kim
*Assistant Examiner* — Charles Chang
(74) *Attorney, Agent, or Firm* — H.C. Park & Associates, PLC

(57) ABSTRACT

A liquid crystal display including a twisted nematic liquid crystal panel and first and second substrates with the twisted nematic liquid crystal panel arranged therebetween. A first biaxial retardation compensation film faces the first substrate and a second biaxial retardation compensation film faces the first biaxial retardation compensation film with the twisted nematic liquid crystal panel arranged therebetween.

18 Claims, 23 Drawing Sheets

LIQUID CRYSTAL DISPLAY

CROSS-REFERENCE TO RELATED APPLICATION

This application claims priority from and the benefit of Korean Patent Application No. 10-2011-0073287, filed on Jul. 22, 2011, which is hereby incorporated by reference for all purposes as if fully set forth herein.

BACKGROUND

1. Field

Exemplary embodiments of the present invention relate to a liquid crystal display, and more particularly, to a liquid crystal display having a wide viewing angle.

2. Discussion of the Background

A liquid crystal display includes a liquid crystal panel and a pair of polarizing plates at both sides of the liquid crystal display. Generally, the liquid crystal display includes an array substrate having a plurality of pixels arranged in a matrix, an opposite substrate facing the array substrate, and liquid crystal molecules disposed between the array substrate and the opposite substrate. The liquid crystal panel may have various liquid crystal modes according to an array structure and a liquid crystal phase of the liquid crystal molecules. For example, liquid crystal panels may be classified into nematic liquid crystal panels having nematic liquid crystal molecules and smectic liquid crystal panels having smectic liquid crystal molecules.

Twisted nematic liquid crystal displays are representative liquid crystal displays having a nematic liquid crystal phase. Twisted nematic liquid crystal displays have excellent light transmittance but narrow viewing angles as compared with other liquid crystal displays.

Discotic liquid crystal (DLC) compensation films may be used for twisted nematic liquid crystal displays to compensate for narrow viewing angles. Such DLC compensation films are manufactured by coating tri-acetyl-cellulose films with discotic liquid crystals. That is, DLC compensation films are manufactured through complex processes, and thus DLC compensation films are expensive.

SUMMARY OF THE INVENTION

Exemplary embodiments of the present invention provide a liquid crystal display having a wide viewing angle with a pair of biaxial retardation compensation films.

Additional features of the invention will be set forth in the description which follows, and in part will be apparent from the description, or may be learned by practice of the invention.

An exemplary embodiment of the present invention discloses a liquid crystal display including: a twisted nematic liquid crystal panel including a first substrate having a first alignment axis defined, a second substrate facing the first substrate and having a second alignment axis intersecting the first alignment axis, and a plurality of liquid crystal molecules continuously twisted from the first alignment axis to the second alignment axis; a first biaxial retardation film facing the first substrate; and a second biaxial retardation film facing the first biaxial retardation film with the twisted nematic liquid crystal panel therebetween, wherein each of the first biaxial retardation film and the second biaxial retardation film has a phase difference Re in a plane direction defined by Re=(nx−ny)×d and a phase difference Rth in a thickness direction defined by Rth={(nx+ny/2−nz)}×d; and the phase difference Re in the plane direction and the phase difference Rth in the thickness direction satisfy 30 nm≤Re≤80 nm and 130 nm≤Rth≤190 nm, respectively, where nx represents a refractive index on a plane in a direction indicated by first axes of the first and second biaxial retardation films, ny represents a refractive index on a plane in a direction indicated by second axes orthogonal to the first axes, nz represents a refractive index in a direction normal to a plane defined by the first and second axes, and d represents a thickness of each of the first and second biaxial retardation films in the normal direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention.

DETAILED DESCRIPTION OF THE ILLUSTRATED EMBODIMENTS

Figure 1:
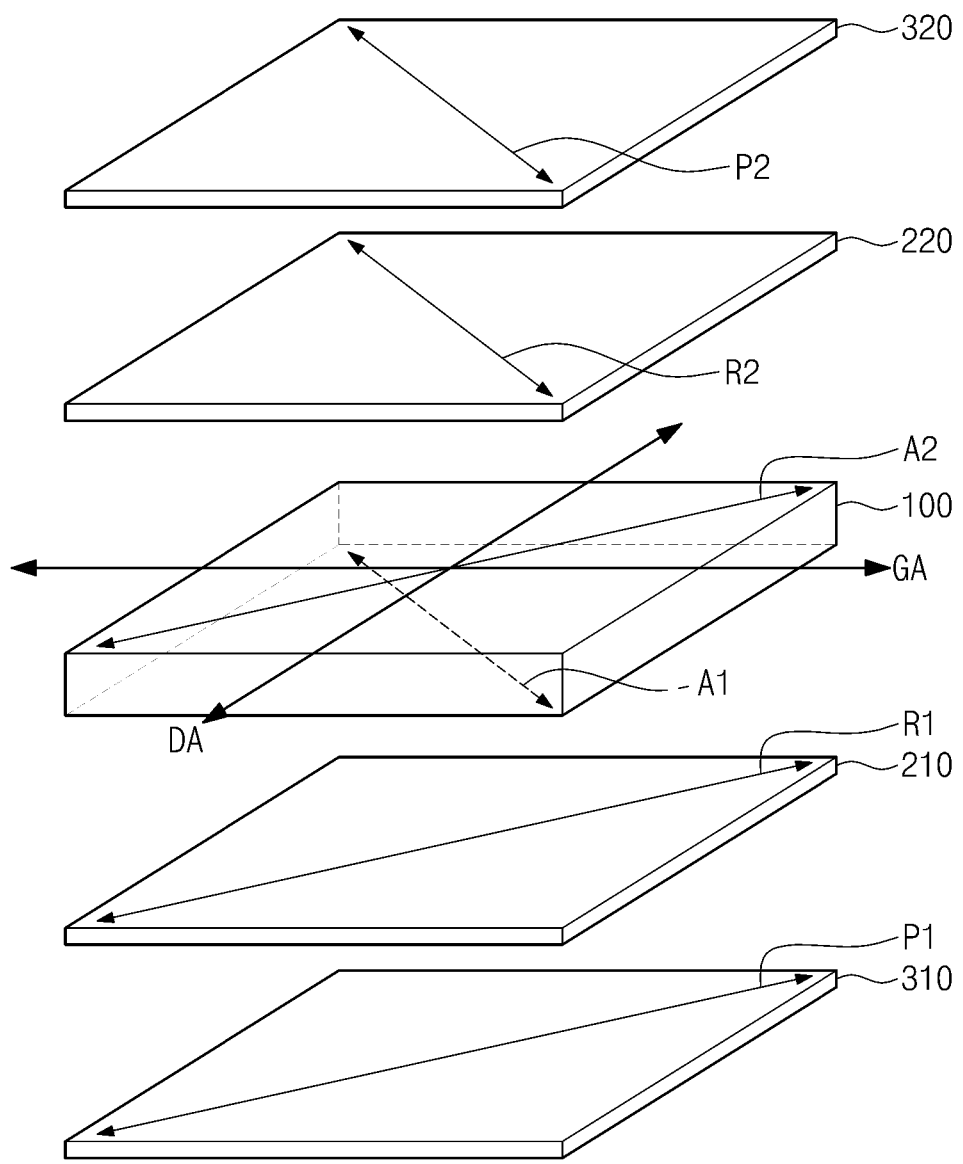
FIG. 1 is an exploded perspective view illustrating a liquid crystal display according to an exemplary embodiment of the present invention.

The invention is described more fully hereinafter with reference to the accompanying drawings, in which embodiments of the invention are shown. The invention may, however, be embodied in many different forms and should not be construed as limited to the embodiments set forth herein. Rather, these embodiments are provided so that this disclosure will be thorough and complete, and will fully convey the scope of the present invention to those skilled in the art. In the drawings, the size and relative sizes of layers and regions may be exaggerated for clarity. Like numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, an exemplary embodiment of the present invention will be described in conjunction with the accompanying drawings.

Figure 2:
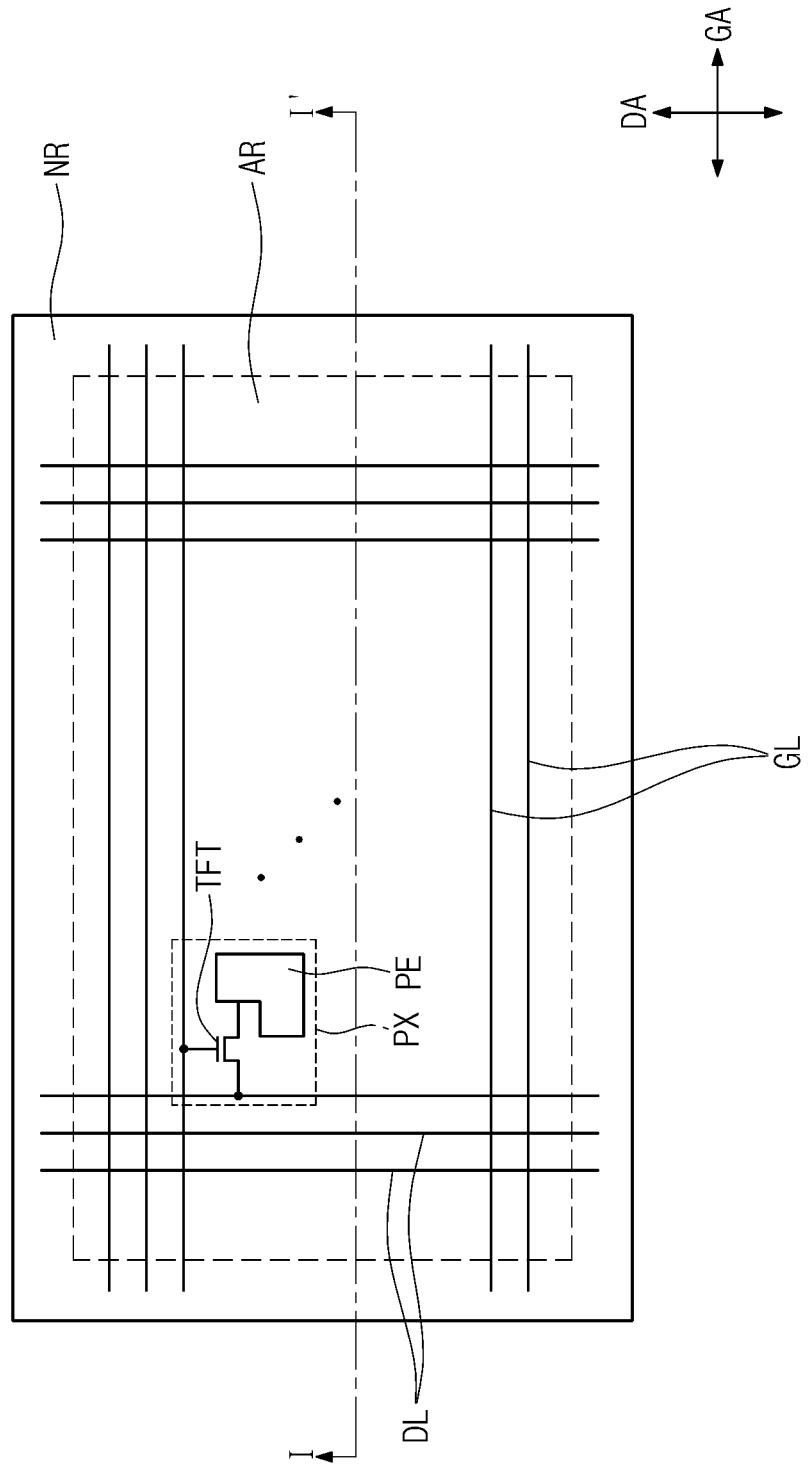
FIG. 2 is a plan view illustrating a liquid crystal in the liquid crystal display of FIG. 1.
Figure 3:
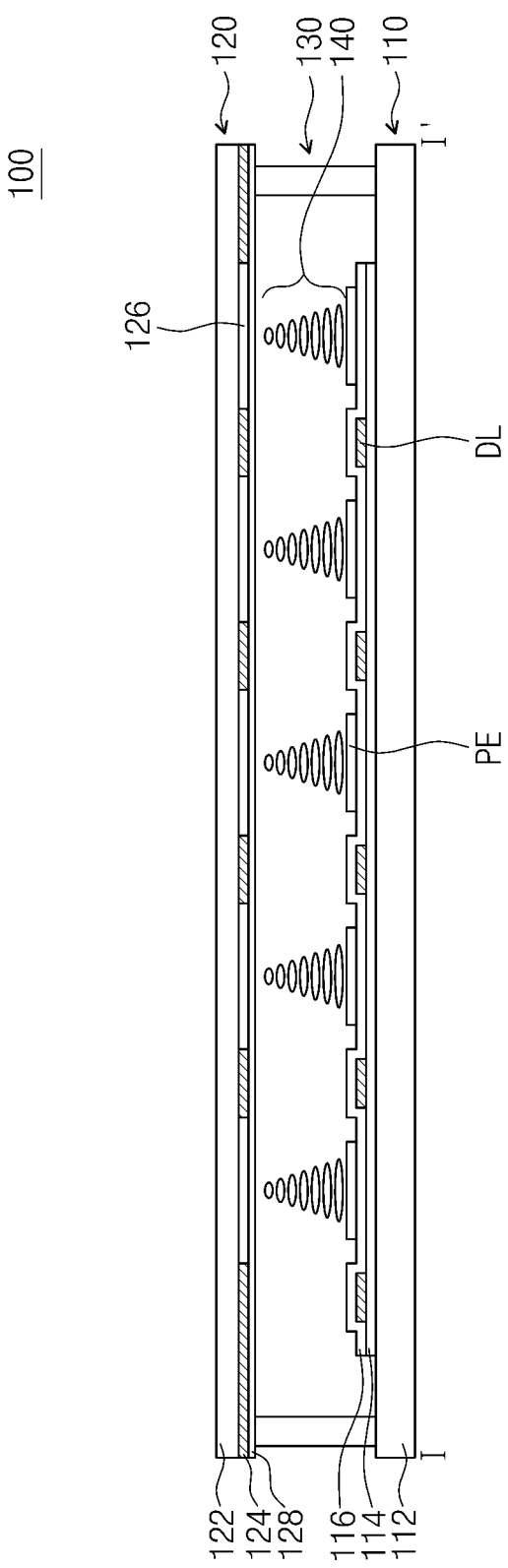
FIG. 3 is a sectional view taken along the line I-I' of FIG. 1.

FIG. 1 is an exploded perspective view illustrating a liquid crystal display according to an embodiment of the present invention. FIG. 2 is a plan view illustrating a liquid crystal in the liquid crystal display of FIG. 1. FIG. 3 is a sectional view taken along the line I-I' of FIG. 2.

Referring to FIG. 1, the liquid crystal display includes a twisted nematic liquid crystal panel 100 (hereinafter, referred to as a liquid crystal panel), and first and second biaxial retardation compensation films 210 and 220 facing each other with the liquid crystal panel 100 therebetween. Additionally, the liquid crystal display further includes a pair of polarizing plates 310 and 320, where the first biaxial retardation compensation film 210, the liquid crystal panel 100, and the second biaxial retardation compensation film 220 are disposed between the polarizing plates 310 and 320.

As shown in FIGS. 2 and 3, the liquid crystal panel 100 includes an array substrate 110, an opposite substrate 120 facing the array substrate 110, a combining member 130 combining the array substrate 110 and the opposite substrate 120, and a plurality of liquid crystal molecules 140 interposed between the array substrate 110 and the opposite substrate 120. Moreover, as shown in FIG. 2, the opposite substrate 120 is omitted to show a detailed configuration of the array substrate 110.

The array substrate 110 includes a first substrate 112 having a display area AR and a non-display area NR, a plurality of gate lines GL on the first substrate 112, a plurality of data lines DL intersecting the gate lines GL, and a plurality of pixels PX each connected to one of the data lines DL and one of the gate lines GL.

The first substrate 112 may be formed of a transparent member and thus may include a glass substrate, a plastic substrate, or a silicon substrate. The display area AR defined in the first substrate 112 is an area where a light generated from a light source such as a backlight unit (not shown) is provided and the non-display area NR is an area adjacent to the display area AR.

Since each pixel PX has the same configuration and function, one pixel is exemplarily described in detail and thus, the same description applies to each pixel PX. Each pixel PX includes a Thin Film Transistor (TFT) for switching a pixel voltage corresponding to an image and a pixel electrode PE electrically connected to the TFT.

The TFT includes a gate electrode, an active layer, a source electrode, and a drain electrode. The gate electrode protrudes from a corresponding line GL among the gate lines GL in the first substrate 112. A gate insulation layer 114 which covers the gate lines GL and the gate electrode, is formed on the first substrate 112. The active layer is formed on the gate insulation layer 114 and the source and drain electrodes are spaced from each other on the active layer to expose it. Additionally, the data lines DL are formed on the gate insulation layer 114. The source electrode protrudes from a corresponding data line DL among the data lines DL.

A protective layer 116, which is formed of an insulation material to cover the source electrode, the drain electrode, and the exposed active layer, is formed on the gate insulation layer 114. The pixel electrode PE of each pixel PX is formed on the protective layer and connected electrically to the drain electrode through a contact hole formed in the protective layer 116.

The opposite substrate 120 includes a second substrate 122 facing the first substrate 112 of the array substrate 110 and a common electrode 128 at one side facing the first substrate 112. Once a common voltage is applied to the common electrode 128, an electric field is formed in the liquid crystal panel 100 due to the common voltage and a pixel voltage applied to the pixel electrode PE.

The second substrate 122 may be formed of the same material as the first substrate 112 and the opposite substrate 120 may further include a black matrix 124 and a color filter 126. The black matrix 124 has a plurality of openings having the same form as the pixel electrode PE in correspondence to the pixels PX in the array substrate 110. Each opening has the color filter 126. The color filter 126 may be formed in the shape of a long straight band facing the pixel electrode PE and may display one of original colors such as red, green, and blue.

The combining member 130 is interposed between the array substrate 110 and the opposite substrate 120 and is disposed on the non-display area NR. The combining member 130 surrounds the display area AR and seals the liquid crystal molecules between the array substrate 110 and the opposite substrate 120.

Alignment layers (not shown) are disposed on the facing sides of the first substrate 112 and the second substrate 122, respectively. First, when an alignment material is rubbed in a first direction and is then applied on the pixel electrode PE and the protective layer 116 of the first substrate 112, the alignment layer is formed with a first alignment axis A1. Additionally, when the alignment material is rubbed in the first direction and is then applied on the common electrode 128 of the second substrate 122, the alignment layer is formed with a second alignment axis A2. The alignment layer has a thickness of about several hundred Å.

The first alignment axis A1 intersects the second alignment axis A2. The first alignment axis A1 can be orthogonal to the second alignment axis A2. When there is no electric field between the array substrate 110 and the opposite substrate 120 (hereinafter, this will be referred to as an "inactivated state"), the liquid crystal molecules 140 are continuously arranged in a state of being twisted from the first alignment axis A1 to the second alignment axis A2.

Figure 4A:
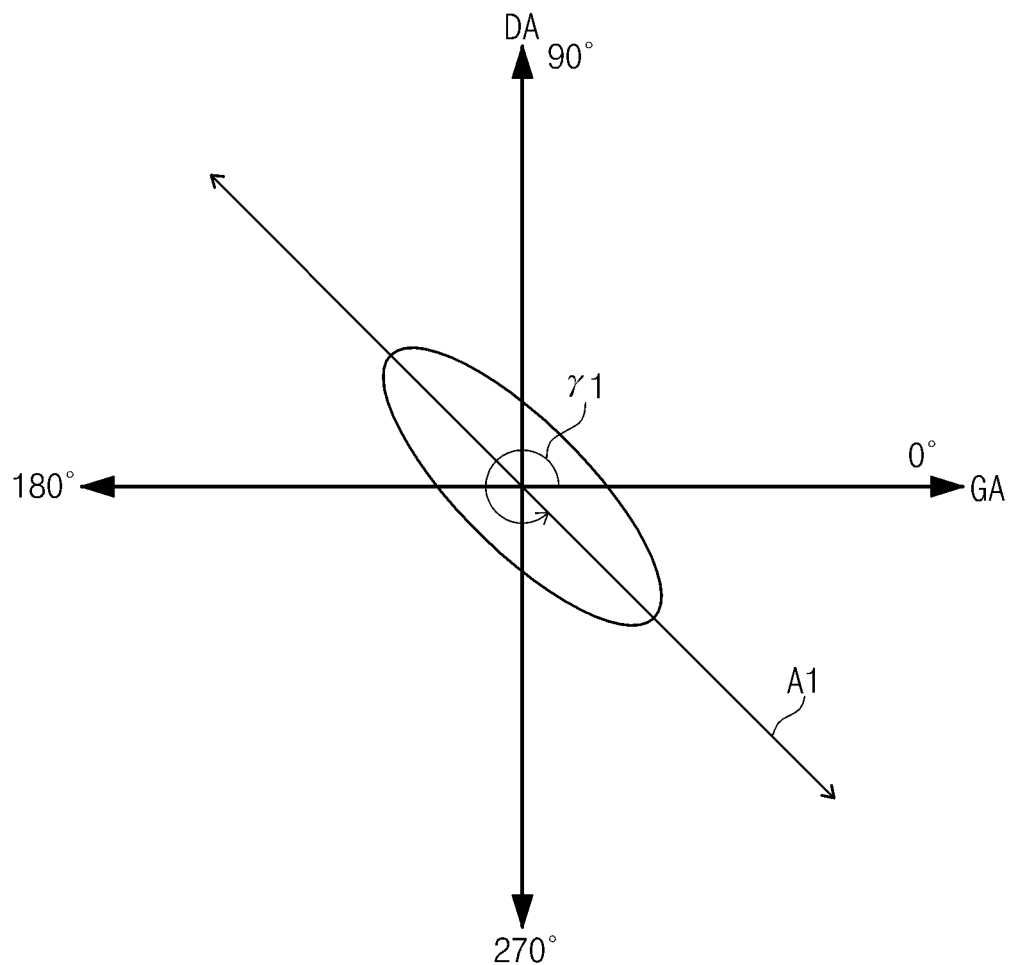
FIG. 4A and FIG. 4B are views illustrating a relation between azimuth axes and the alignment axes and a twist angle of the liquid crystal molecules with respect to the azimuth axes in an inactivated state.
Figure 4B:
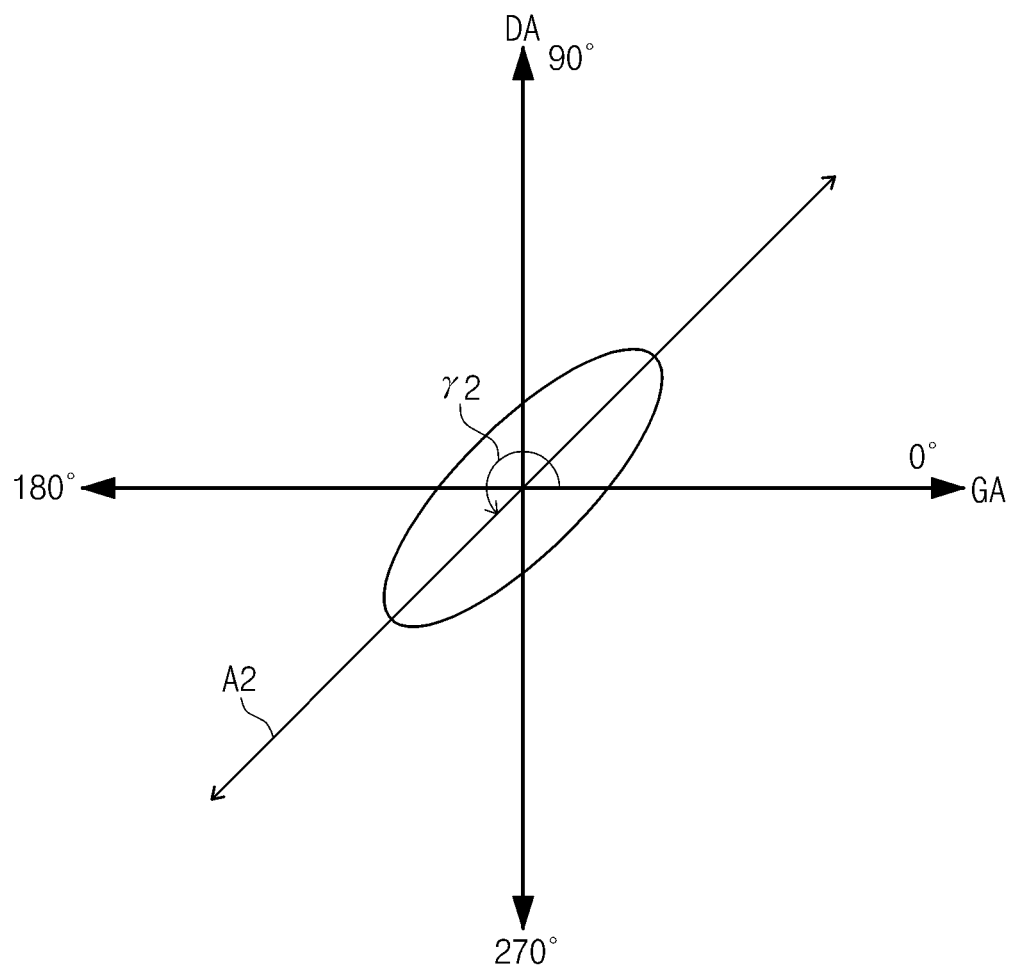

FIGS. 4A and 4B are views illustrating a relation between azimuth axes GA and DA and the alignment axes A1 and A2 and a twist angle of the liquid crystal molecules 140 with respect to the azimuth axes GA and DA in an inactivated state.

The azimuth axes GA and DA are a reference representing the degree of twist of the liquid crystal molecules 140. The twist angle of the liquid crystal molecules is a relative value and this specification defines the azimuth axes GA and DA parallel to the gate line GL and the data line DL to represent the degree of twist of the liquid crystal molecules.

FIG. 4A is a view illustrating a twist angle γ1 of a liquid crystal molecule (hereinafter, referred to as a "first liquid crystal molecule"), which is the most adjacent to the first substrate 112 among the liquid crystal molecules 140 in an inactivated state. The first liquid crystal molecule is twisted at about 315° from the azimuth axis GA in a counter clockwise direction.

Additionally, FIG. 4B is a view illustrating a twist angle γ2 of a liquid crystal molecule (hereinafter, referred to as a "second liquid crystal molecule"), which is the most adjacent to the second substrate 122 among the liquid crystal molecules 140 in an inactivated state. The second liquid crystal molecule is twisted at about 225° from the azimuth axis GA in a counter clockwise direction.

Accordingly, the liquid crystal molecules 140 in the inactive state including the first liquid crystal mole and the second liquid crystal have the twist angles of about 315° to about 225° and are continuously arranged as being twisted in a clockwise direction.

Moreover, when an electric field is formed between the array substrate 110 and the opposite substrate 120 (hereinafter, referred to as "an active state"), the liquid crystal molecules 140 are rearranged. Accordingly, the progression properties of the light passing through the liquid crystal molecules 140 in the active state differ from that of the light passing through the liquid crystal molecules 140 in the inactive state. This will be described in detail with reference to FIGS. 5A and 5B.

Figure 5A:
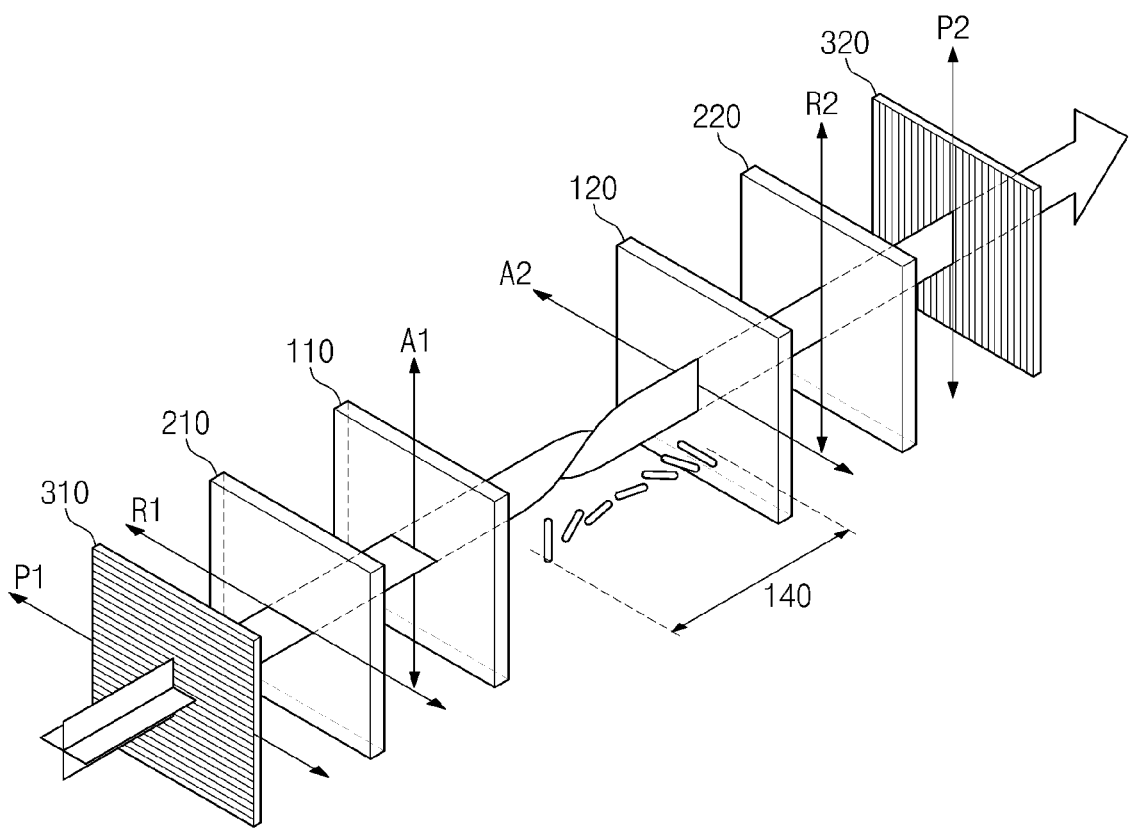
FIG. 5A is a mimetic diagram illustrating a progress property of a light in an inactive state.
Figure 5B:
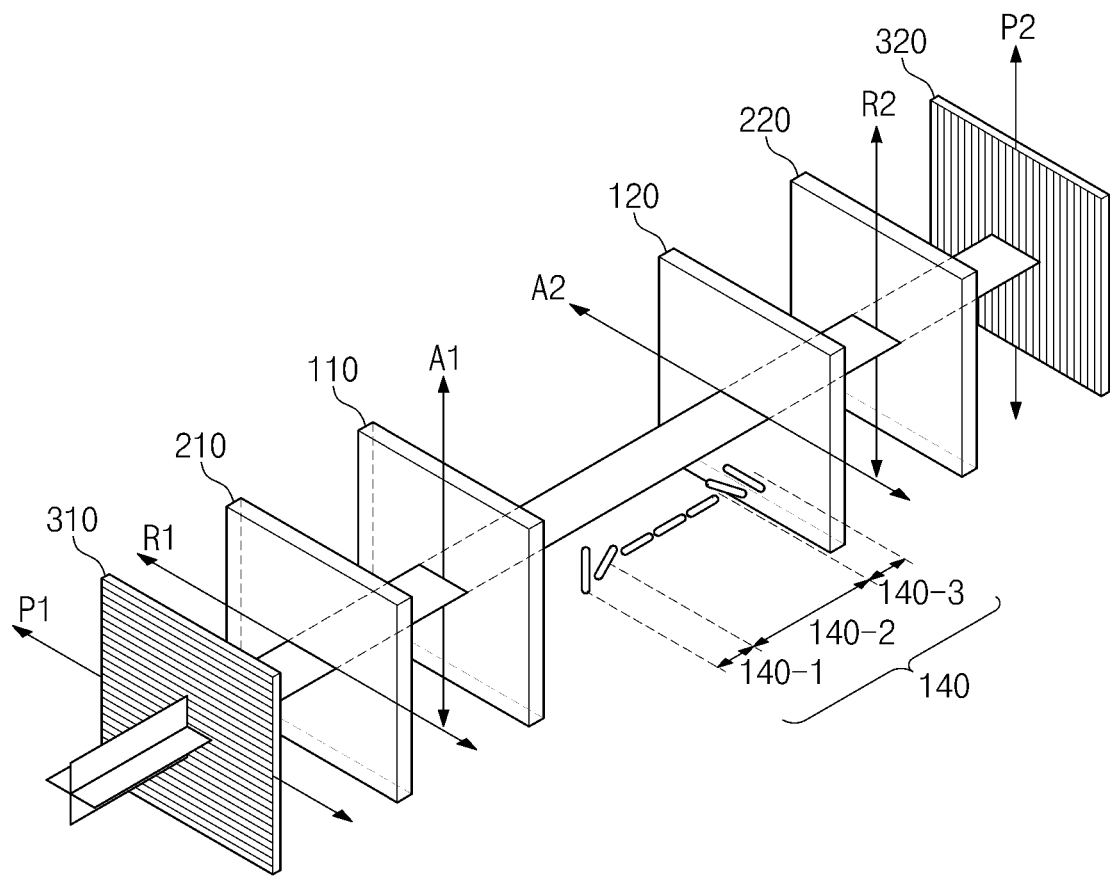
FIG. 5B is a mimetic diagram illustrating a progress property of a light in an active state.

FIGS. 5A and 5B are views illustrating a liquid crystal display of a normally white mode displaying white in an inactive state. In relation to the liquid crystal display of the normally white mode, a first transmission axis P1 of the first polarizing plate 310 is substantially orthogonal to a second transmission axis P2 of the second polarizing plate 320.

First, referring to FIG. 5A, a configuration of the liquid crystal molecules 140 and a progression property of the light in the inactive state will be described. The liquid crystal molecules 140 are continuously arranged as being twisted from the first liquid crystal molecule aligned parallel to the first alignment axis A1 to the second liquid crystal molecule aligned parallel to the second alignment axis A2. Additionally, the liquid crystal molecules 140 may have no tilt angle or a small tilt angle.

When examining the progression property of the light, in relation to a scattered light emitted from a backlight unit (not shown) such as a Light Emitting Diode (LED) package or an incandescent lamp, only a linear polarized light parallel to the first transmission axis P1 is transmitted through the first polarizing plate 310, and the remaining light is absorbed. While the linear polarized light passes through the plurality of liquid crystal molecules 140, it is twisted about 90° and passes through the second polarizing plate 320 to display white.

Moreover, although the first transmission axis P1 is orthogonal to the first alignment axis A1 and the second transmission axis P2 is orthogonal to the second alignment axis A2, as shown in FIGS. 5A and 5B, the first transmission axis P1 may be parallel to the first alignment axis A1 and the second transmission axis P2 may be parallel to the second alignment axis A2.

Furthermore, although the liquid crystal display of the normally white mode is exemplarily shown in FIGS. 5A and 5B, a liquid crystal display of a normally black mode may be used. At this point, the first transmission axis P1 is substantially parallel to the second transmission axis P2. Accordingly, the liquid crystal display of the normally black mode displays black because the linearly polarized light passing through the first polarizing plate 310 is twisted at about 90° while passing through the plurality of liquid crystal molecules 140 and does not penetrate the second polarizing plate 320.

A configuration of the liquid crystal molecules 140 and a progression property of the light in the active state will be described with reference to FIG. 5B. Once the electric field is formed, the liquid crystal molecules 140 are rearranged, so that they are divided into a plurality of lower liquid crystal molecules 140-1 including the first liquid crystal molecule, a plurality of upper liquid crystal molecules 140-3 including the second liquid crystal molecule, and a plurality of middle liquid crystal molecules 140-2 interposed between the lower liquid crystal molecules 140-1 and the upper liquid crystal molecules 140-3. The middle liquid crystal molecules 140-2 are defined as liquid crystal molecules that are substantially arranged vertically to the array substrate 110 or the opposite substrate 120.

In relation to the scattered light, only a linearly polarized light parallel to the first transmission axis P1 is transmitted through the first polarizing plate 310, and the remaining light is absorbed. Since the linearly polarized light passes through the plurality of rearranged liquid crystal molecules 140 but does not pass through the second polarizing plate 320, black is displayed. Since the lower liquid crystal molecules 140-1 and the upper liquid crystal molecules 140-3 are not substantially orthogonal to the array substrate 110 or the opposite substrate 120, and have a tilted arrangement in the active state, when the linearly polarized light passes through the liquid crystal molecules 140, phase delay occurs. The phase delay causes a reduction in the contrast ratio of the liquid crystal display.

In order to improve the contrast ratio, the liquid crystal display includes the first and second biaxial retardation compensation films 210 and 220, as shown in FIG. 1. The first biaxial retardation compensation film 210 is disposed between the liquid crystal panel 100 and the first polarizing plate 310, and the second biaxial retardation compensation film 220 is disposed between the liquid crystal panel 100 and the second polarizing plate 320.

Figure 6:
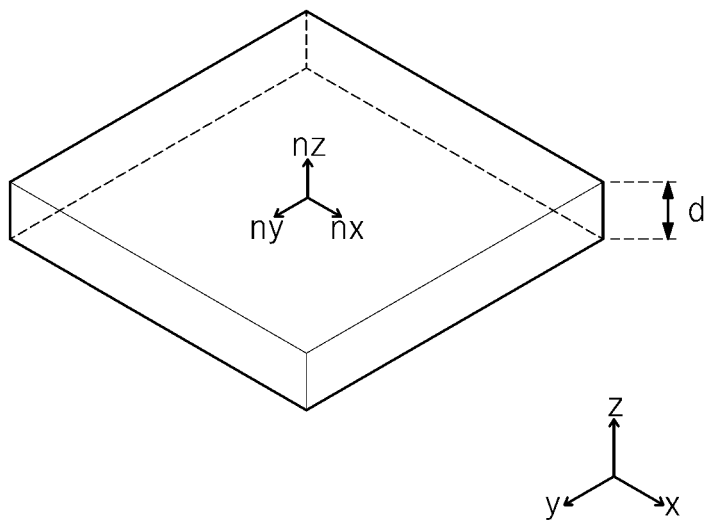
FIG. 6 is a view illustrating a biaxial retardation film in the liquid crystal display of FIG. 1.

Referring to FIG. 6, the first and second biaxial retardation compensation films 210 and 220 will be examined. A material through which the light passes has refractive indices nx, ny, and nz in respective x, y, and z axis directions which are orthogonal to each other. If the refractive indices nx, ny, and nz are the same, the material is called isotropic and if at least one of the refractive indices nx, ny, and nz is different from the others, the material is called anisotropic. In a case of a film, a first axis (or an x-axis) and a second axis (or a y-axis) orthogonal to the first axis defines an area of the film and a third axis (or a z-axis) defines a thickness d of the film perpendicular to the area that the first axis and the second axis define.

When two of the refractive indices nx, ny, and nz are the same but one is different in the film, the film is defined as a uniaxial film and when three of the refractive indices nx, ny, and nz are different in the film, the film is defined as a biaxial film.

The first and second biaxial retardation compensation films 210, 220 each has a phase difference Re in a plane direction defined by Equation 1 below and a phase difference Rth in a thickness direction defined by Equation 2 below.

$$Re = (nx - ny) \times d \qquad \text{[Equation 1]}$$

$$Rth = \{(nx + ny/2 - nz)\} \times d \qquad \text{[Equation 2]}$$

In each of the first and second biaxial retardation compensation films 210 and 220, the phase difference Re in the plane direction and the phase difference Rth in the thickness direction satisfy Equation 3 and Equation 4 below.

$$30 \text{ nm} \leq Re \leq 80 \text{ nm} \qquad \text{[Equation 3]}$$

$$130 \text{ nm} \leq Rth \leq 190 \text{ nm} \qquad \text{[Equation 4]}$$

At this point, as derived from Equation 1 to Equation 3, the refractive index nx in the first axis (R1 refer to FIGS. 1, 5A, and 5B) of the first biaxial retardation compensation film 210 is greater than the refractive index ny in the second axis. Likewise, the refractive index nx in the first axis (R2 refer to FIGS. 1, 5A, and 5B) of the second biaxial retardation compensation film 220 is greater than the refractive index ny in the second axis.

The liquid crystal display includes the first and second biaxial retardation compensation films 210 and 220 satisfying Equation 3 and Equation 4 so that a phase difference occurring in the liquid crystal molecules 140 is compensated in an opposite direction. Accordingly, the contrast ratio of the liquid crystal display is improved and a horizontal viewing angle becomes wide. That is, the contrast ratio calculated at a predetermined polar angel satisfies 10:1.

In more detail, since the first biaxial retardation compensation film 210 has the phase difference Re in the plane direction and the phase difference Rth in the thickness direction satisfying Equation 3 and Equation 4, the phase difference occurring when the light passes through the lower liquid crystal molecules 140-1 (refer to FIG. 5B) is compensated. Since the second biaxial retardation compensation film 220 has the phase difference Re in the plane direction and the phase difference Rth in the thickness direction satisfying Equation 3 and Equation 4, the phase difference occurring when the light passes through the upper liquid crystal molecules 140-3 (refer to FIG. 5B) is compensated.

For this, the first axis R1 of the first biaxial retardation compensation film 210 may be orthogonal to the first alignment axis A1 and the first axis R2 of the second biaxial retardation compensation film 220 may be orthogonal to the second alignment axis A2 of the first axis R2.

Here, the first biaxial retardation compensation film 210 may have the same phase difference Re in the plane direction and the same phase difference Rth in the thickness direction as the second biaxial retardation compensation film 220. That is, since the same biaxial retardation compensation film is used, manufacturing costs may be reduced.

These biaxial retardation compensation films 210 and 220 may include a Cyclo-Olefin Polymer (COP) based material. The biaxial retardation compensation film including the COP based material has greater durability than films including a typical TriAcetate Cellulose (TAC) material.

Additionally, in order to improve the contrast ratio, the liquid crystal display applies the driving voltage of about 5 V to about 10 V to the liquid crystal panel. That is, a potential difference between the pixel voltage and the driving voltage applied to the pixel electrode and the common electrode, respectively, in the liquid crystal panel is about 5 V to about 10 V.

Referring to FIG. 5B, the liquid crystal molecules 140 have a predetermined twist angle and tilt angle and are divided into the three liquid crystal molecules 140-1 to 140-3 in the active state. At this point, the middle liquid crystal molecules 140-2 have a greater tilt angle than the lower liquid crystal molecules 140-1 and the upper liquid crystal molecules 140-3. Accordingly, the middle liquid crystal molecules 140-2 may not substantially affect the phase delay of the light penetrating the liquid crystal molecules 140.

Since the middle liquid crystal molecules 140-2 have a large tilt angle and are substantially arranged orthogonal to the array substrate 110 and the opposite substrate 120, they are parallel to the progress direction of the light and thus do not affect the progress of the light. Since the lower liquid crystal molecules 140-1 and the upper liquid crystal molecules 140-3 have a smaller tilt angle than the middle liquid crystal molecules 140-2, the phase delay of the light occurs. Once a driving voltage of about 5 V to about 10 V is applied to the liquid crystal panel 100, a tilt angle of the liquid crystal molecules 140 is increased overall and thus a range of the middle liquid crystal molecules 140-2 is increased while a range of the lower and upper liquid crystal molecules 140-1 and 140-3 is decreased. Therefore, the phase delay of the light is reduced. Driving voltages of less than about 5 V or more than or equal to about 10 V are not appropriate for a portable display device having a narrow range of middle liquid crystal molecules, such as a laptop computer.

Moreover, in order to improve the contrast ratio, a dielectric anisotropy constant $\Delta\in$ of the liquid crystal molecules 140 may be about 10 to 15. Each of the liquid crystal molecules 140 has a nematic liquid crystal phase. Accordingly, the liquid crystal molecules 140 have a dielectric constant $\in_\parallel$ parallel to and a dielectric constant $\in_\perp$ vertical to the length of the liquid crystal molecule. The dielectric anisotropy constant $\Delta\in$ is defined by the following Equation 5 below.

$$\Delta\in = \in_\parallel - \in_\perp \qquad \text{[Equation 5]}$$

Even when the same driving voltage is applied to the liquid crystal molecules 140 having a dielectric anisotropy constant $\Delta\in$ of about 10 to about 15, since their tilt angles are increased overall to increase the range of the middle liquid crystal molecules 140-2 and decrease is the ranges of the lower and upper liquid crystal molecules 140-1 and 140-3, the phase delay of the light is reduced.

Figure 7:
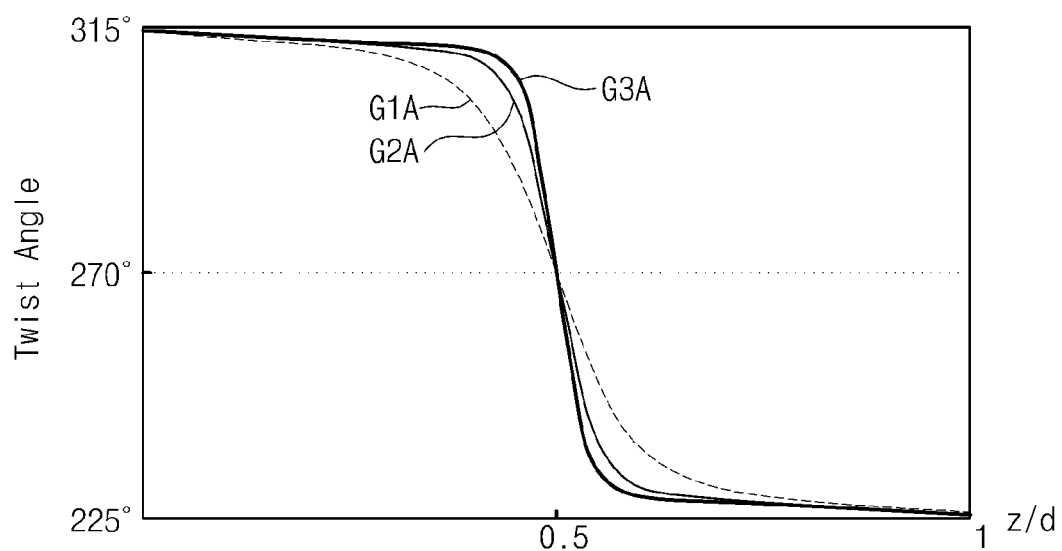
FIG. 7 and FIG. 8 are graphs illustrating a twist angle change and a tilt angle change of a plurality of liquid crystal molecules in an active state.
Figure 8:
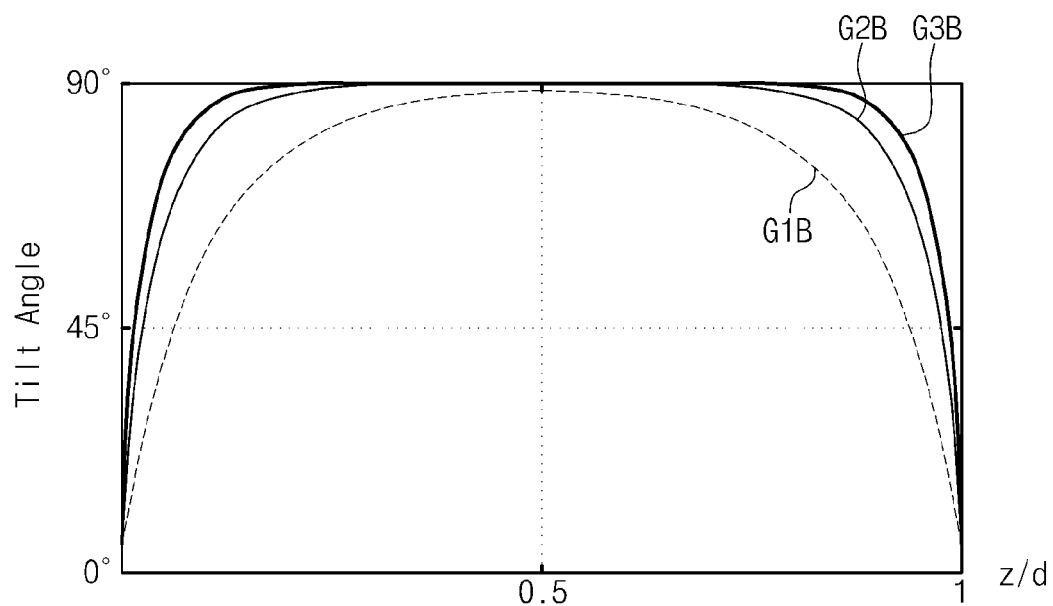

FIGS. 7 and 8 are graphs illustrating a twist angle change and a tilt angle change of a plurality of liquid crystal molecules in an active state. The graphs G1A and G1B shown in FIGS. 7 and 8 illustrate the twist angle change and the tilt angle change of the liquid crystal molecules 140 whenever the dielectric anisotropy constant $\Delta\in$ of the liquid crystal molecules 140 is about 6.4 and the driving voltage is about 5 V. Additionally, the graphs G2A and G2B illustrate the twist angle change and the tilt angle change of the liquid crystal molecules 140 whenever the dielectric anisotropy constant $\Delta\in$ of the liquid crystal molecules 140 is about 12.5 and the driving voltage is about 5 V. Furthermore, the graphs G3A and G3B illustrate the twist angle change and the tilt angle change of the liquid crystal molecules 140 whenever the dielectric anisotropy constant $\Delta\in$ of the liquid crystal molecules 140 is about 12.5 and the driving voltage is about 7 V.

As shown in FIGS. 7 and 8, according to the graphs G2A, G2B, G3A, and G3B satisfying the conditions of the present invention, the range of the middle liquid molecules 140-2 (refer to FIG. 5B) having a tilt angle of about 90° is substantially and drastically increased when compared to the graphs G1A and G1B not satisfying the conditions of the present invention. As the range of the middle liquid crystal molecules 140-2 is increased, a viewing angle becomes wide. This will be described in detail with reference to FIGS. 9 to 34.

Figure 9:
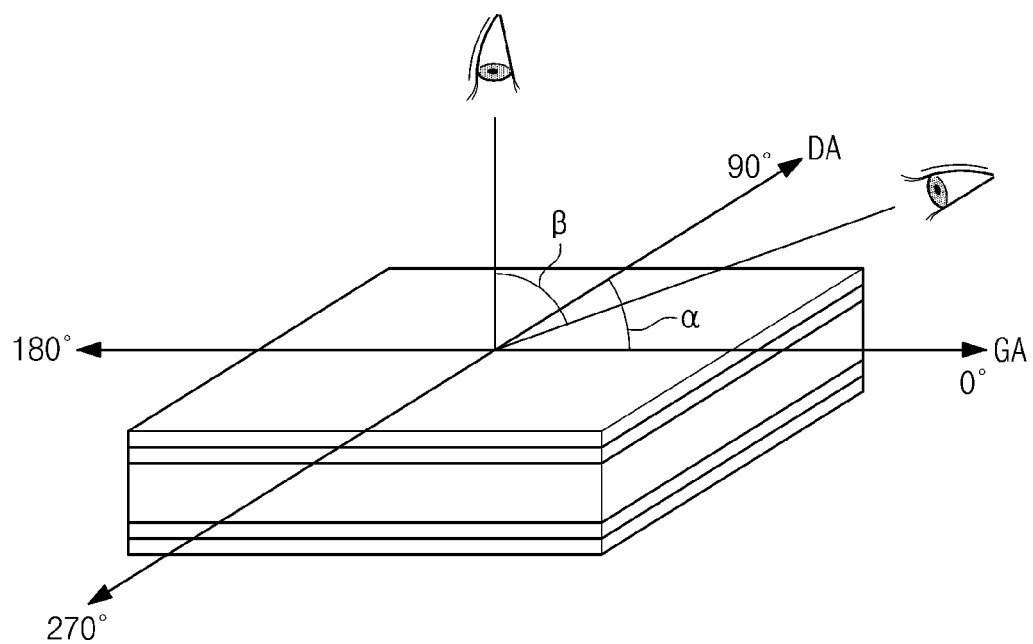
FIG. 9 is a view illustrating a method of calculating a viewing angle property of the liquid crystal display of FIG. 1.

FIG. 9 is a view illustrating a method of calculating a viewing angle property of the liquid crystal display of FIG. 1. FIGS. 10 to 34 are graphs illustrating a viewing angle property of the liquid crystal display of FIG. 1.

The contrast ratio is defined as the ratio of the luminance of the brightest color is (white) to that of the darkest color (black), i.e., a value obtained by dividing the luminance of the brightness color by the luminance of the darkest color. A viewing angle is defined as the maximum angle at which a display can be viewed with acceptable visual performance. In more detail, the liquid crystal display has a contrast ratio which varies drastically according to a viewing angle, and an angle at which the contrast ratio is maintained at a value which is greater than a predetermined value is defined as the viewing angle.

Referring to FIG. 9, an azimuth angle $\alpha$ is defined in a counter clockwise direction based on the azimuth axis GA. Additionally, an included angle between an axis perpendicular to the liquid crystal display and an axis having a predetermined angle to the liquid crystal display is defined as a polar angle β. Generally, the liquid crystal display has a lower contrast ratio measured at a point having a predetermined polar angle β than a front contrast ratio.

The liquid crystal display according to the present invention includes a pair of biaxial retardation compensation films 210 and 220 having the phase difference Re in the plane direction and the phase difference Rth in the thickness direction satisfying Equation 3 and Equation 4, so that the contrast ratio measured at a point having a predetermined polar angle β is improved and the range of the polar angle β having a predetermine contrast ratio (in detail, 10:1) is increased. As a result, a viewing angle is improved.

Hereinafter, referring to FIGS. 10 to 34, a viewing angle property of the liquid crystal display shown in FIG. 1 will be examined. The contrast ratios shown in the graphs of FIGS. 10 to 34, as shown in FIGS. 4A and 4B, are measured at a point having a polar angle β of about 80° with respect to the liquid crystal panel 100 including the liquid crystal molecules 140, which are continuously aligned in a clockwise direction at angles of about 315° to about 225°. Additionally, the dielectric anisotropy constant Δ∈ of the liquid crystal molecules 140 is about 12.5.

In more detail, the graphs GC (GC-1 to GC-25) in FIGS. 10 to 34 represent contrast ratios measured at points having azimuth angles α of about 0° and about 180° (the contrast ratio measured at the point having the azimuth angle α of about 0° is identical to that measured at the point having the azimuth angle α of about 180°). The graphs GC90 (GC90-1 to GC90-25) represent contrast ratios measured at points having the azimuth angle α of about 90° and the graphs GC270 (GC270-1 to GC270-25) represent contrast ratios measured at a point having the azimuth angle α of about 270°. Moreover, the graphs represent contrast ratios according to the driving voltage applied to the liquid crystal panel 100.

First, whenever the phase difference Re of the plane direction of each of the biaxial retardation compensation films 210 and 220 is less than about 30 nm, even when the phase different Rth in the thickness direction has a range of about 130 nm to about 190 nm, the contrast ratio at the points having predetermined azimuth angles α (especially, about 90° and about 270°) is less than 10:1. Additionally, if the phase difference Re of the plane direction of each of the biaxial retardation compensation films 210 and 220 is more than about 80 nm, even when the phase different Rth in the thickness direction has a range of about 130 nm to about 190 nm, the contrast ratio at the points having predetermined azimuth angles α (especially, about 90° and about 270°) is less than 10:1. Moreover, even if the phase difference Re in the plane direction is about 30 nm to about 80 nm and the phase difference Rth in the thickness direction is about 130 nm to about 190 nm, the contrast ratio measured at the point having the azimuth angle α of about 90° and at the point having the azimuth angle α of about 270° is generally less than that measured at the point having the azimuth angle α of about 0° and at the point having the azimuth angle α of about 180°.

Figure 10:
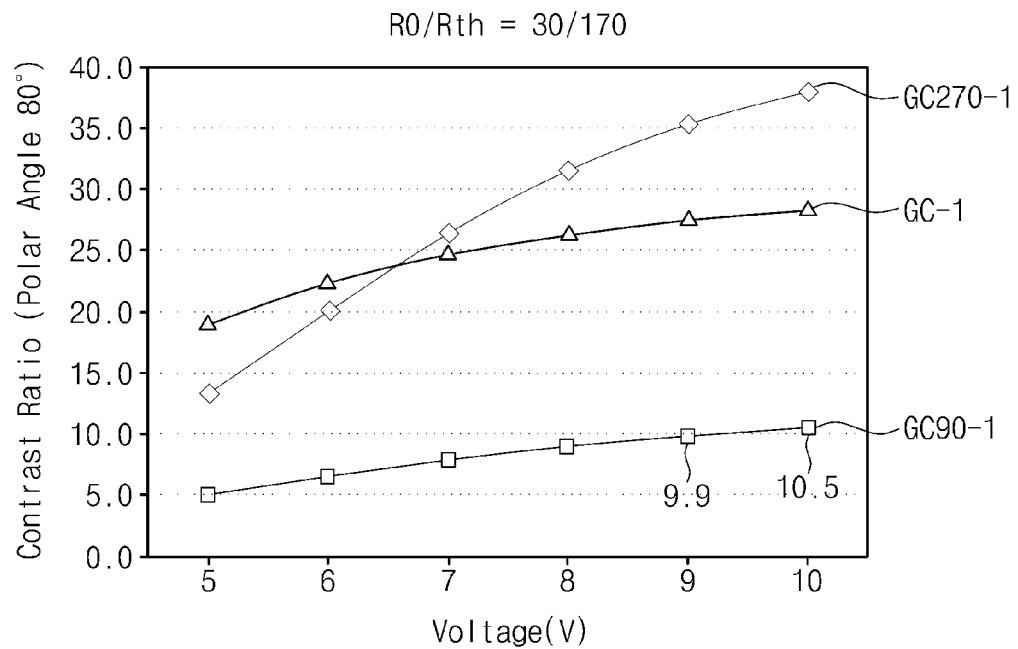
FIGS. 10 to 34 are graphs illustrating a viewing angle property of the liquid crystal display of FIG. 1.
Figure 11:
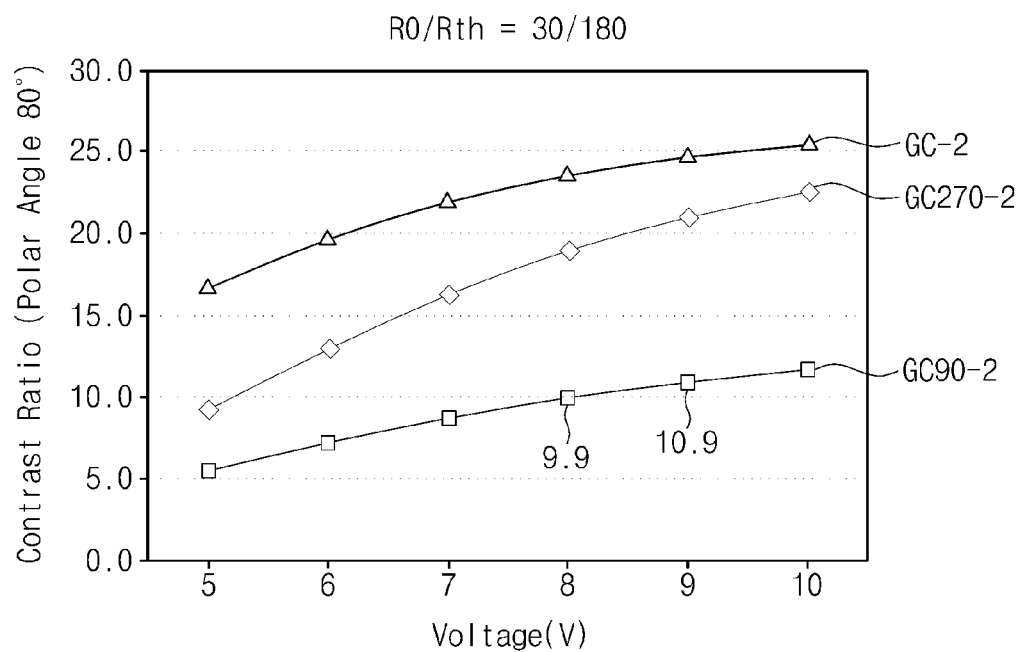
Figure 12:
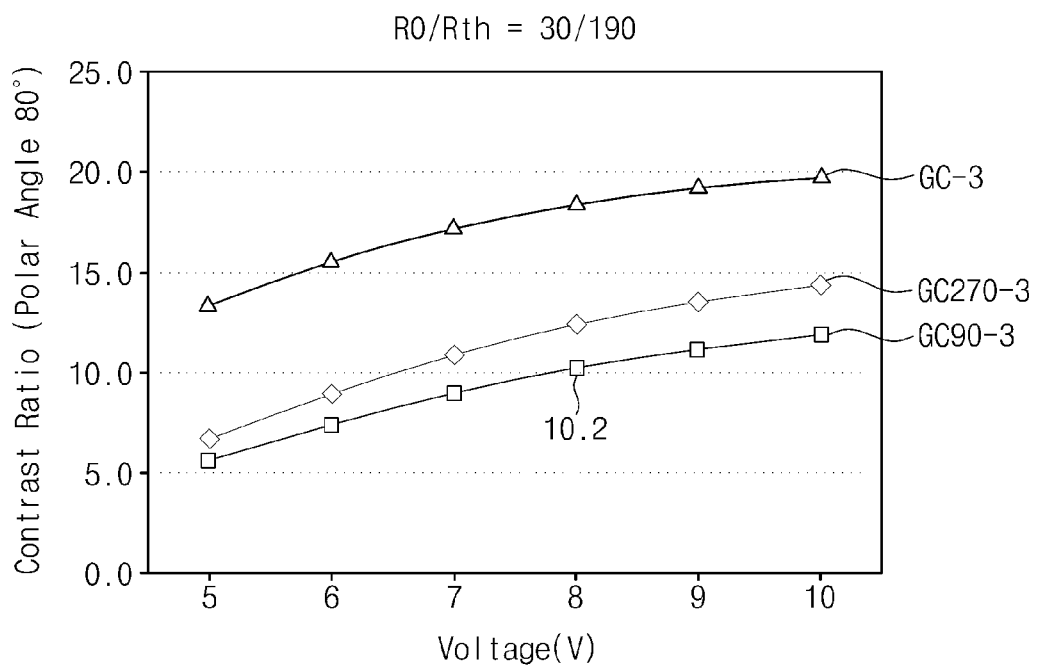

FIGS. 10 to 12 are views illustrating a contrast ratio of the liquid crystal display including the biaxial retardation compensation films 210 and 220 having the phase difference Re in the plane direction of about 30 nm. FIGS. 10 to 12 are views illustrating a contrast ratio of the liquid crystal display including the biaxial retardation compensation films 210 and 220 having the phase differences Rth in the thickness direction of about 170 nm, about 180 nm, and about 190 nm, respectively. If the phase difference Rth in the thickness direction is less than about 170 nm, the contrast ratio at the point having a predetermined azimuth angle α (especially, about 90°) is less than 10:1.

As shown in FIG. 10, when the driving voltage is about 10 V, all the contrast ratios measured at the four points having the azimuth angles α of about 0°, about 90°, about 180°, and about 270° are more than or equal to 10:1. Additionally, as shown in FIG. 11, when the driving voltage is about 9 V to about 10 V, all the contrast ratios measured at the four points are more than or equal to 10:1. Additionally, as shown in FIG. 12, when the driving voltage is about 8 V to about 10 V, all the contrast ratios measured at the four points are more than or equal to 10:1. Like this, when the phase difference Re in the plane direction is about 30 nm and the phase difference Rth in the thickness direction is about 170 nm to about 190 nm, the contrast ratio is proportional to the driving voltage and the phase difference Rth in the thickness direction.

FIGS. 13 to 16 are views illustrating a contrast ratio of the liquid crystal display including the biaxial retardation compensation films 210 and 220 having the phase difference Re in the plane direction of about 40 nm. Additionally, FIGS. 13 to 16 are views illustrating a contrast ratio of the liquid crystal display including the biaxial retardation compensation films 210 and 220 having the phase differences Rth in the thickness direction of about 160 nm, about 170 nm, about 180 nm, and about 190 nm, respectively. If the phase difference Rth in the thickness direction is less than about 160 nm, the contrast ratio at the point having a predetermined azimuth angle α (especially, about 90°) is less than 10:1. Moreover, if the phase difference Rth in the thickness direction is more than about 190 nm, the contrast ratio at the point having a predetermined azimuth angle α (especially, about 270°) is less than 10:1.

Figure 13:
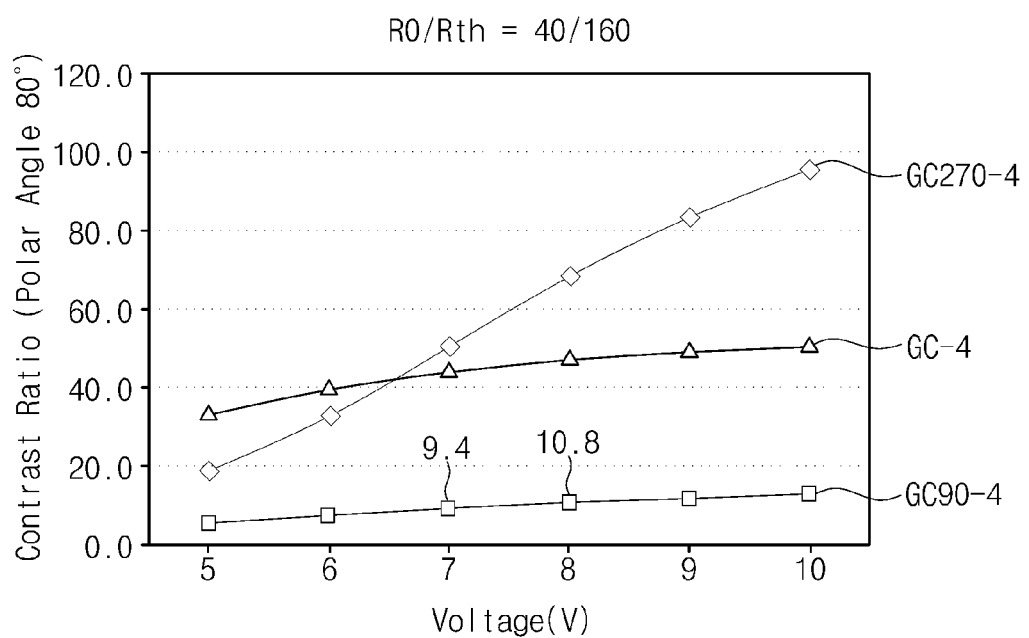
Figure 14:
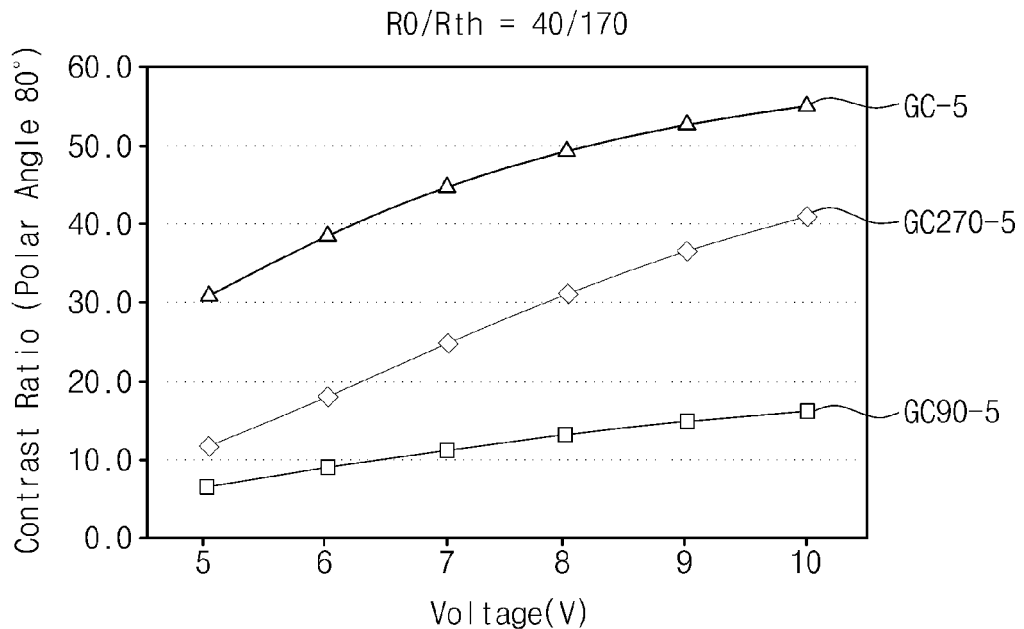
Figure 15:
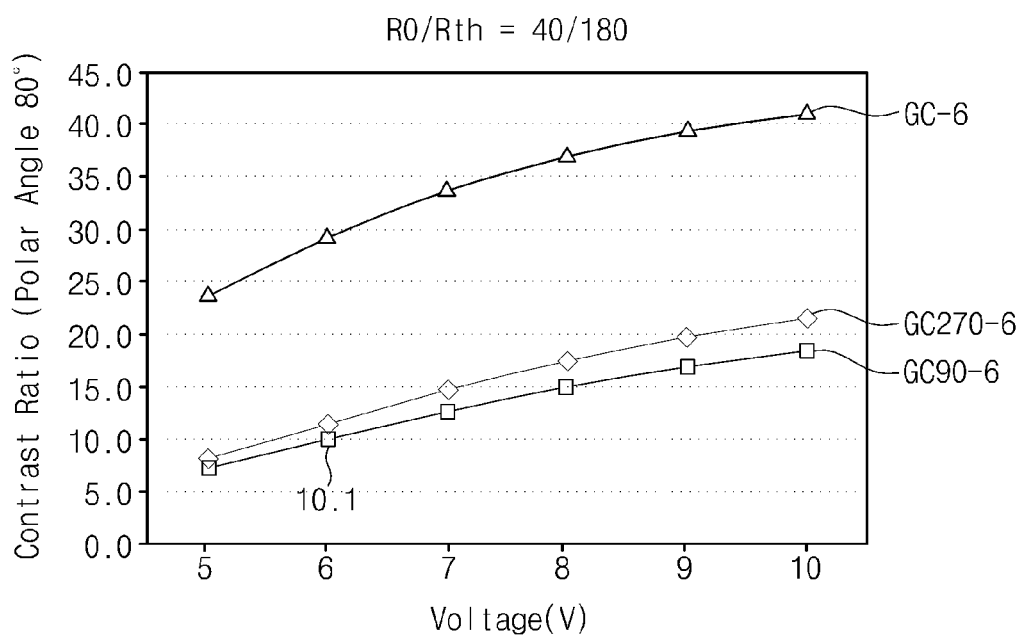
Figure 16:
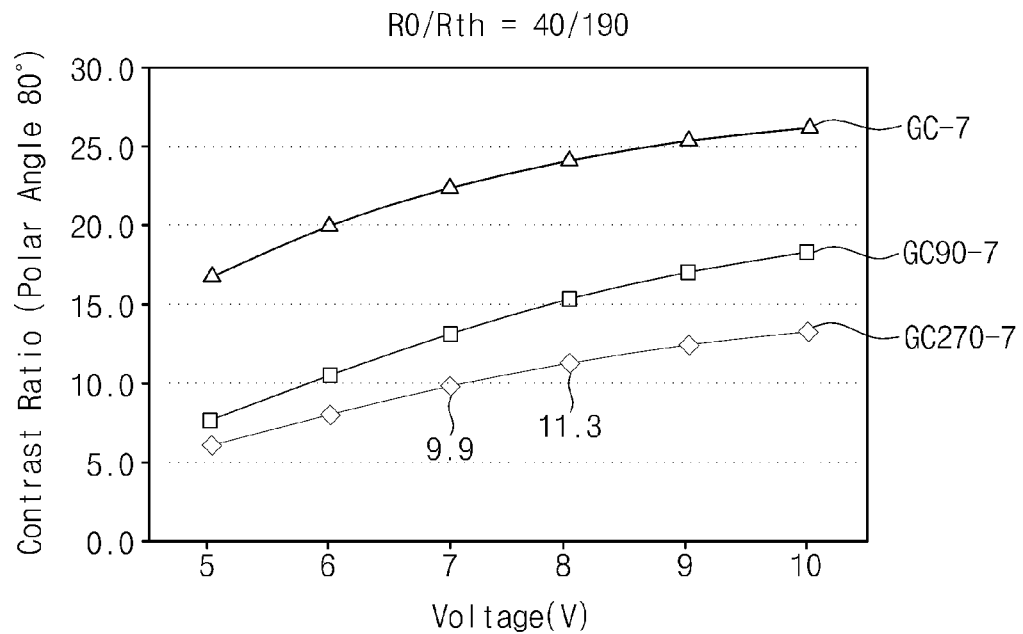

As shown in FIG. 13, when the driving voltage is about 8 V to about 10 V, all the contrast ratios measured at the four points are more than or equal to 10:1. Additionally, as shown in FIG. 14, when the driving voltage is about 7 V to about 10 V, all the contrast ratios measured at the four points are more than or equal to 10:1. Additionally, as shown in FIG. 15, when the driving voltage is about 6 V to about 10 V, all the contrast ratios measured at the four points are more than or equal to 10:1. Additionally, as shown in FIG. 16, when the driving voltage is about 8 V to about 10 V, all the contrast ratios measured at the four points are more than or equal to 10:1. As shown in FIG. 15, when the phase difference Re of the phase direction is about 40 nm and the phase difference Rth in the thickness direction is about 180 nm, it is shown that the range of the driving voltage having the contrast ratio of more than 10:1 is the widest.

FIGS. 17 to 21 are views illustrating a contrast ratio of the liquid crystal display including the biaxial retardation compensation films 210 and 220 having the phase difference Re in the plane direction of about 50 nm. Additionally, FIGS. 17 to 21 are views illustrating a contrast ratio of the liquid crystal display including the biaxial retardation compensation films 210 and 220 having the phase differences Rth in the thickness direction of about 150 nm, about 160 nm, about 170 nm, about 180 nm, and about 190 nm, respectively. If the phase difference Rth in the thickness direction is less than about 150 nm the contrast ratio at the point having a predetermined azimuth angle α (especially, about 90°) is less than 10:1. Moreover, if the phase difference Rth in the thickness direction is more than about 190 nm, the contrast ratio at the point having a predetermined azimuth angles α (especially, about 270°) is less than 10:1.

Figure 17:
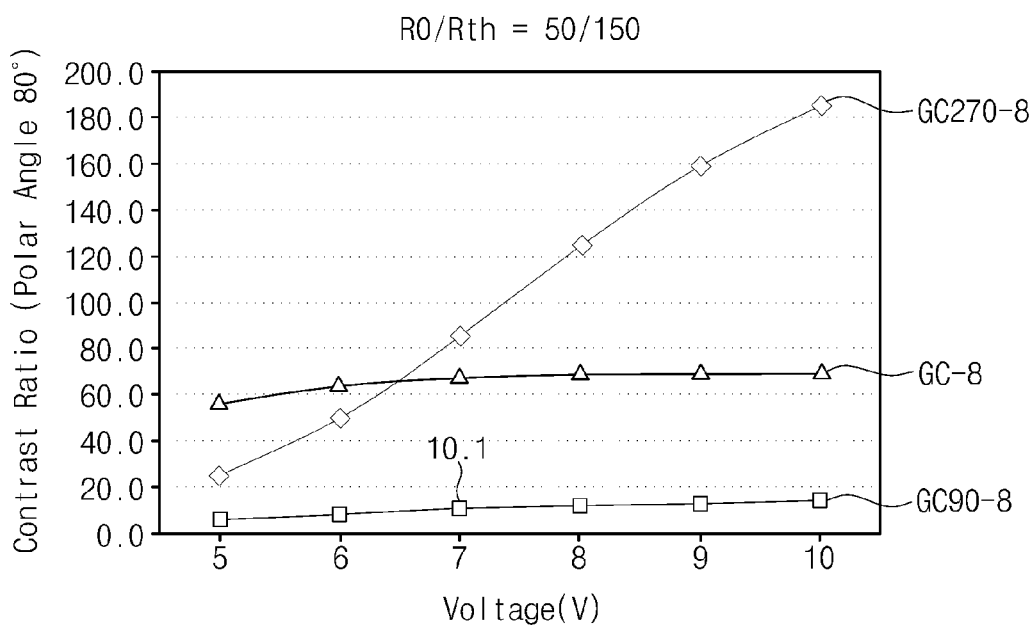
Figure 18:
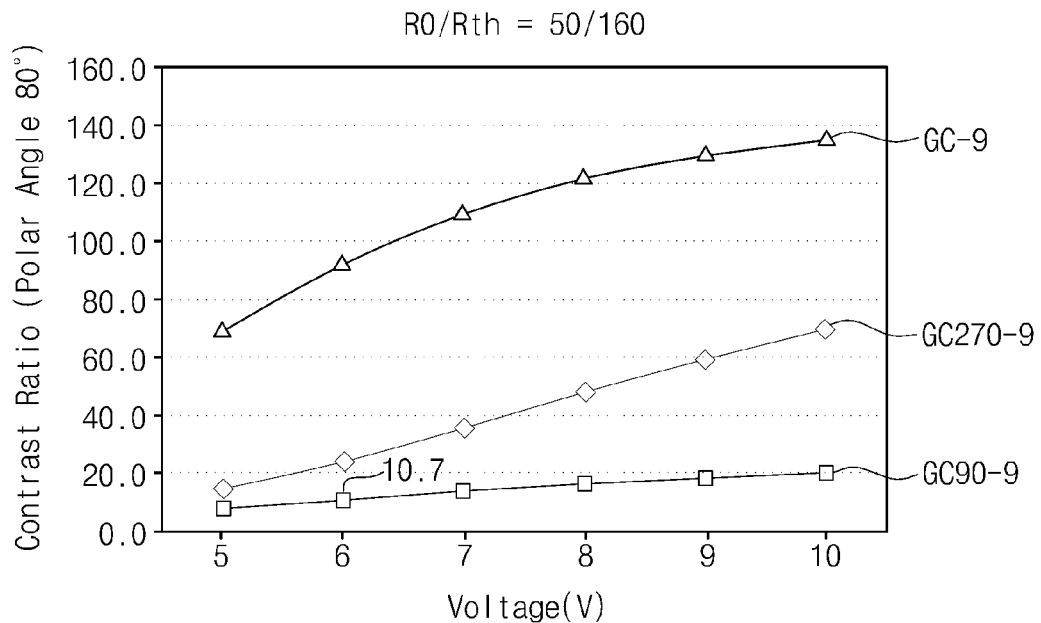
Figure 19:
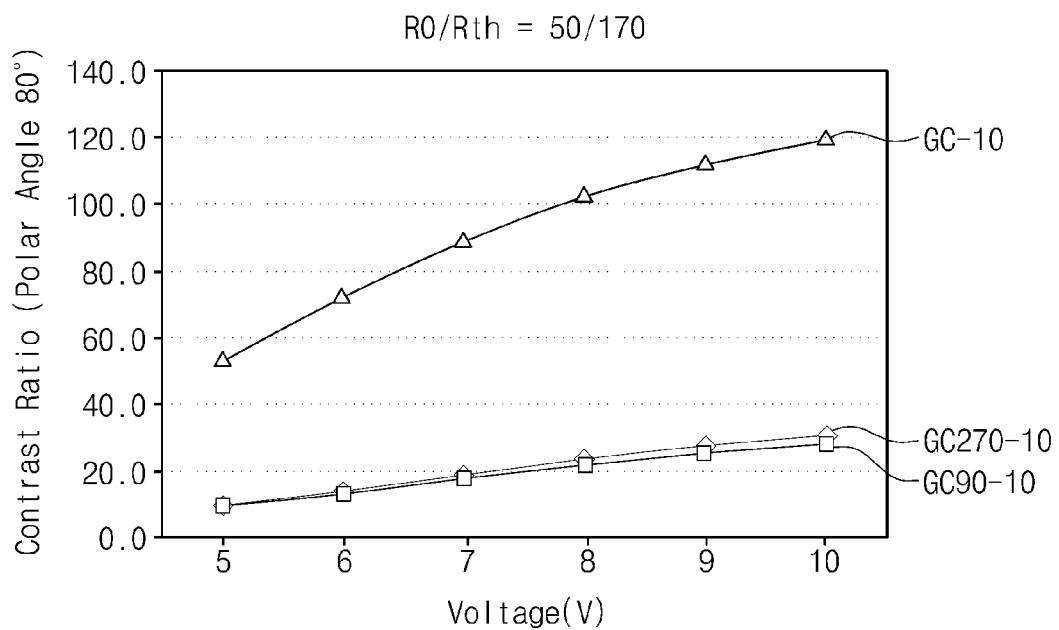
Figure 20:
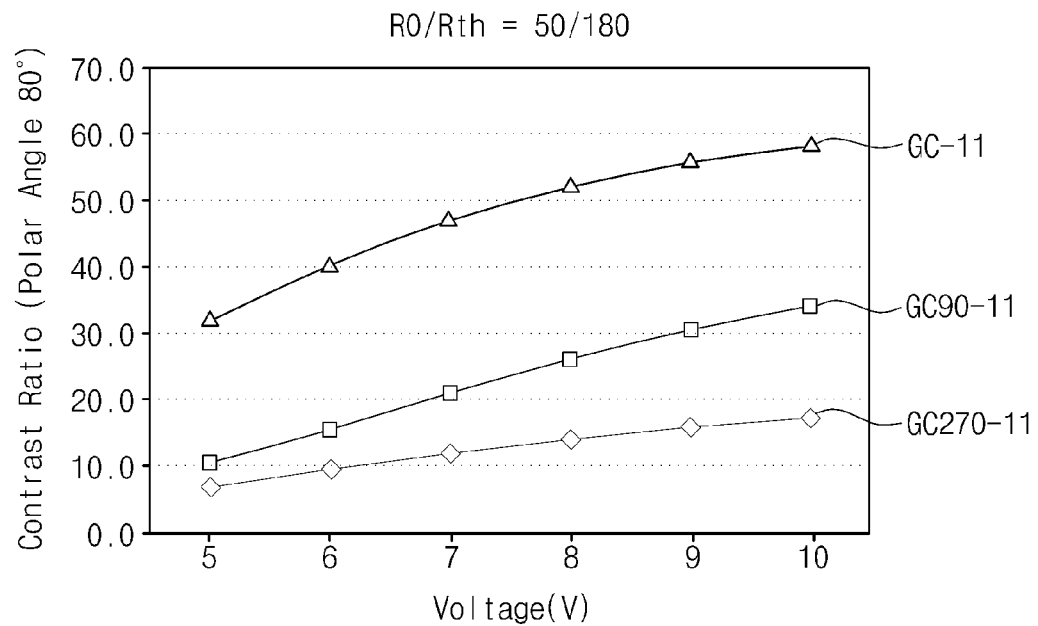
Figure 21:
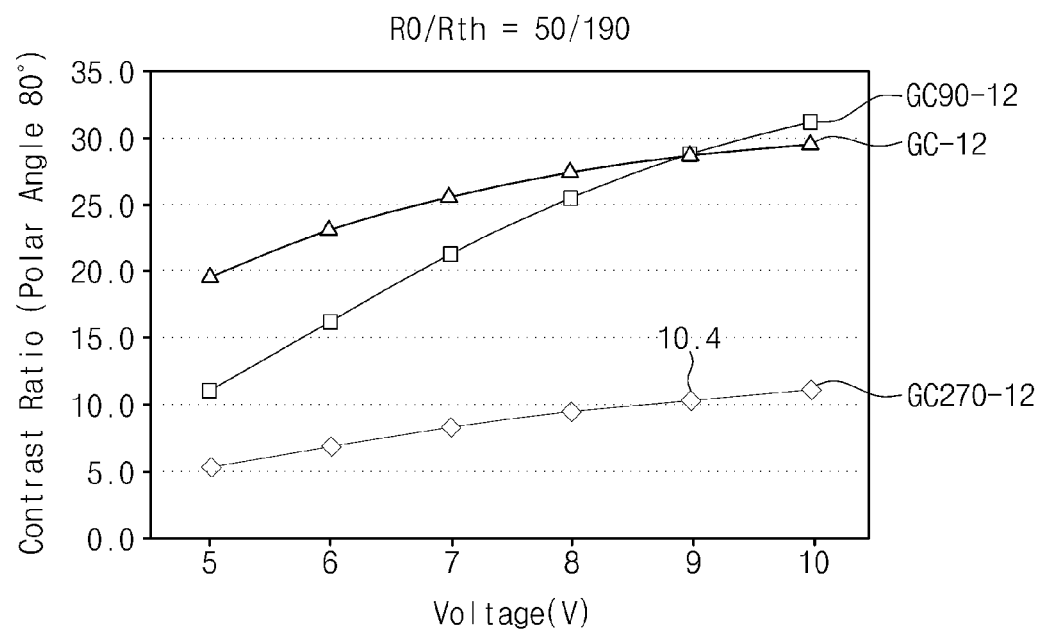

As shown in FIG. 17, when the driving voltage is about 7 V to about 10 V, all the contrast ratios measured at the four points are more than or equal to 10:1. Additionally, as shown in FIG. 18, when the driving voltage is about 6 V to about 10 V, all the contrast ratios measured at the four points are more than or equal to 10:1. Additionally, as shown in FIG. 19, when the driving voltage is about 6 V to about 10 V, all the contrast ratios measured at the four points are more than or equal to 10:1. In more detail, when the driving voltage is about 5 V, the contrast ratio at the point having the azimuth angle $\alpha$ of about 90° is 9.1:1 and the contrast ratio at the point having the azimuth angle $\alpha$ of about 270° is 9.6:1. When the driving voltage is about 6 V, the contrast ratio at the point having the azimuth angle $\alpha$ of about 90° is 13.3:1 and the contrast ratio at the point having the azimuth angle $\alpha$ of about 270° is 14.2:1. Additionally, as shown in FIG. 20, when the driving voltage is about 7 V to about 10 V, all the contrast ratios measured at the four points are more than or equal to 10:1. Moreover, as shown in FIG. 21, when the driving voltage is about 9 V to about 10 V, all the contrast ratios measured at the four points are more than or equal to 10:1.

As shown in FIGS. 18 and 19, when the phase difference Re of the phase direction is about 50 nm and the phase difference Rth in the thickness direction is about 160 nm to about 170 nm, it is shown that the range of the driving voltage having the contrast ratio of more than or equal to 10:1 is the widest. Additionally, when the phase difference Re of the phase direction is about 50 nm and the phase difference Rth in the thickness direction is about 170 nm, the contrast ratio at the point having the azimuth angle $\alpha$ of about 90° is similar to that at the point having the azimuth angle $\alpha$ of about 270° and the contrast ratio at the point having the azimuth angle $\alpha$ of about 0° is similar to that at the point having the azimuth angle $\alpha$ of about 180°. Therefore, a viewing angle is uniform.

FIGS. 22 to 26 are views illustrating a contrast ratio of the liquid crystal display including the biaxial retardation compensation films 210 and 220 having the phase difference Re in the plane direction of about 60 nm. Additionally, FIGS. 22 to 26 are views illustrating a contrast ratio of the liquid crystal display including the biaxial retardation compensation films 210 and 220 having the phase differences Rth in the thickness direction of about 140 nm, about 150 nm, about 160 nm, about 170 nm, and about 180 nm, respectively. Whenever the phase difference Rth in the thickness direction is less than about 140 nm, the contrast ratio at the point having a predetermined azimuth angle $\alpha$ (especially, about 90°) is less than 10:1. Moreover, whenever the phase difference Rth in the thickness direction is more than about 180 nm, the contrast ratio at the point having a predetermined azimuth angle $\alpha$ (especially, about 270°) is less than 10:1.

Figure 22:
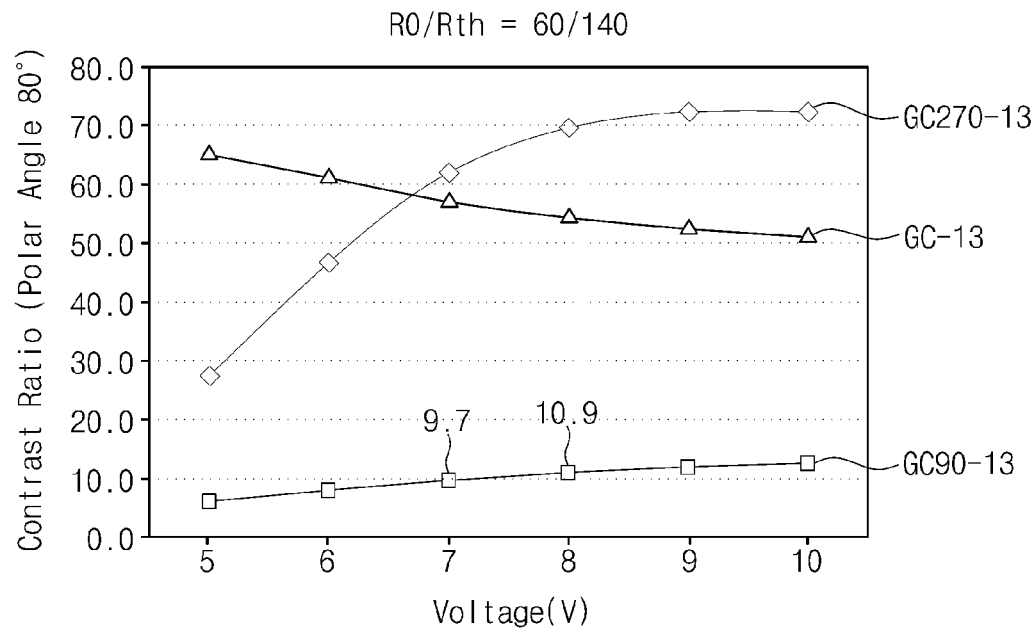
Figure 23:
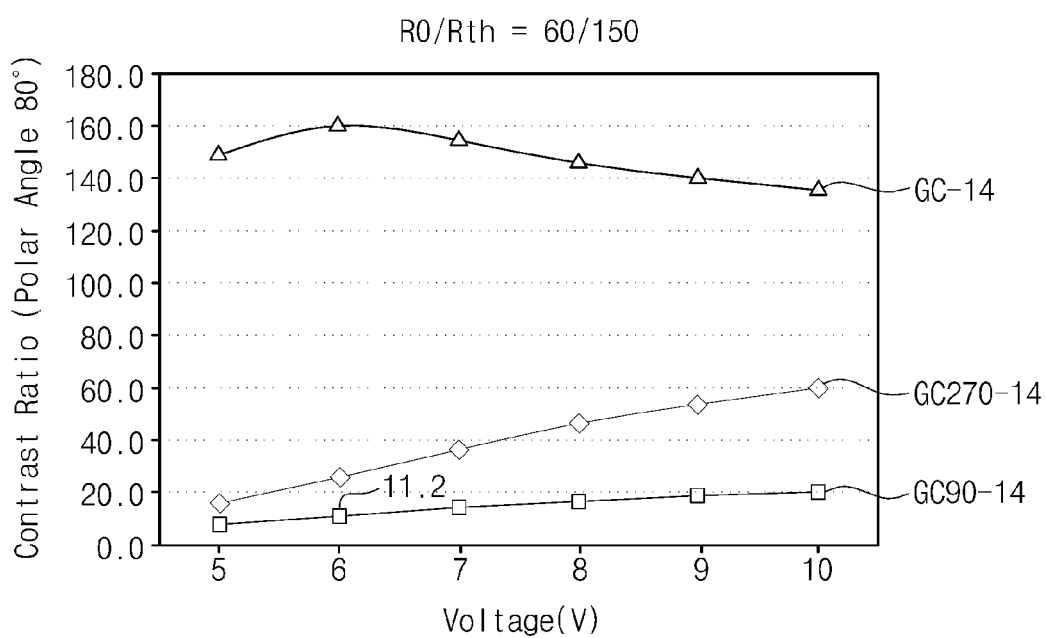
Figure 24:
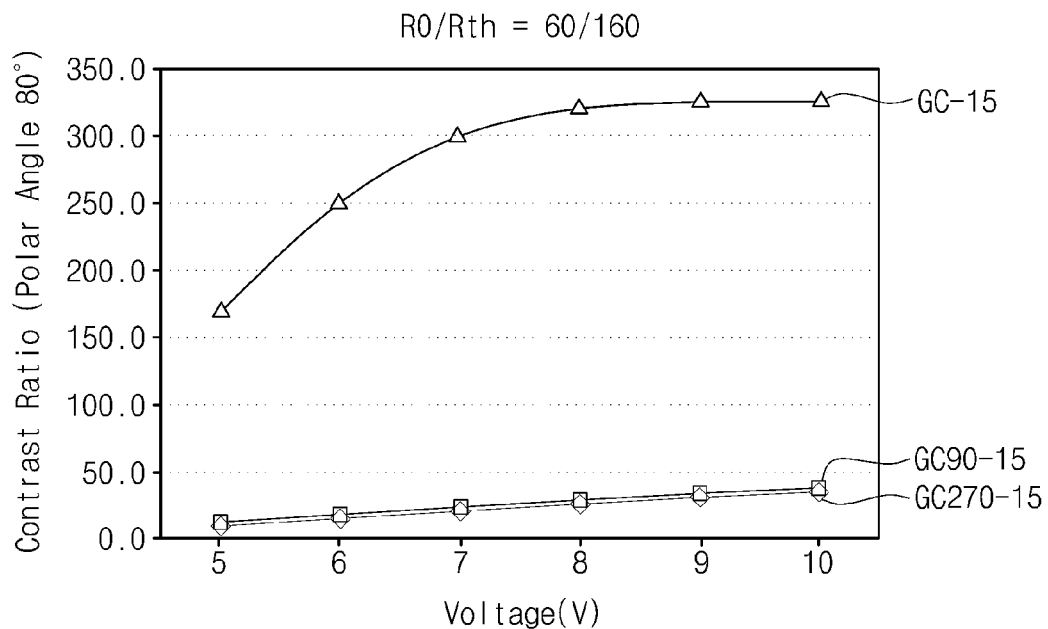
Figure 25:
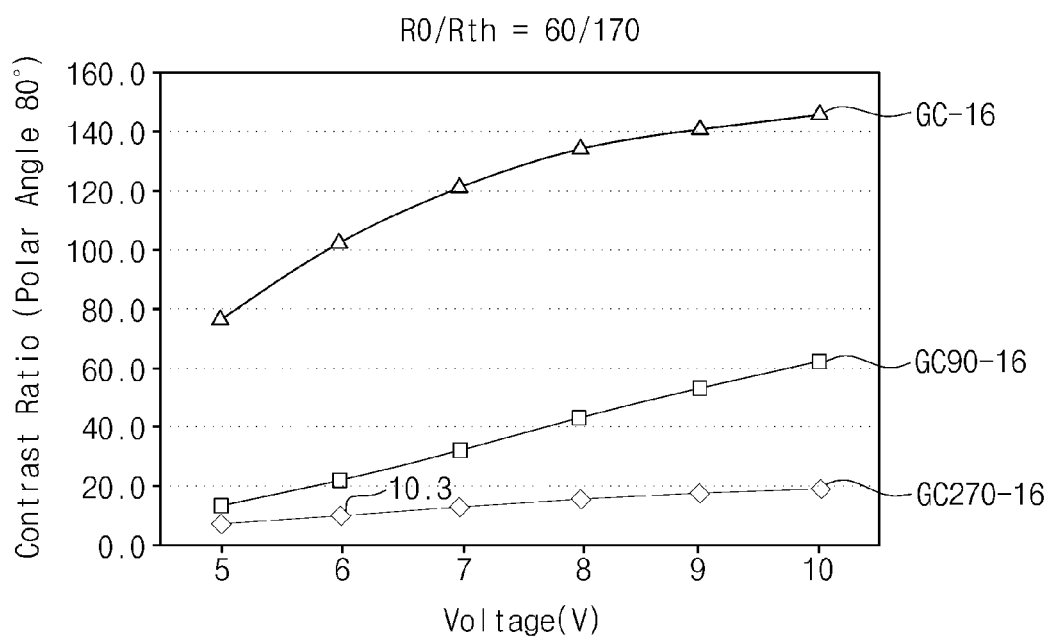
Figure 26:
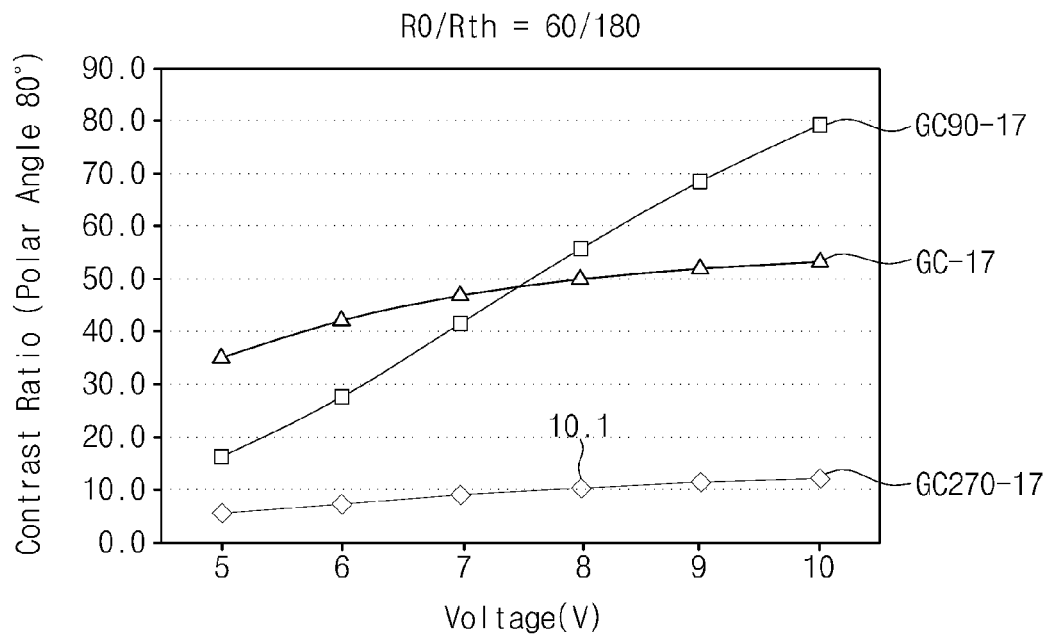

As shown in FIG. 22, when the driving voltage is about 8 V to about 10 V, all the contrast ratios measured at the four points are more than or equal to 10:1. Additionally, as shown in FIG. 23, when the driving voltage is about 6 V to about 10 V, all the contrast ratios measured at the four points are more than or equal to 10:1. Additionally, when the driving voltage is about 5 V, the contrast ratio at the point having the azimuth angle $\alpha$ of about 90° is 8.1:1. Additionally, as shown in FIG. 24, when the driving voltage is about 5 V to about 10 V, all the contrast ratios measured at the four points are more than or equal to 10:1. In more detail, when the driving voltage is about 5 V, the contrast ratio at the point having the azimuth angle $\alpha$ of about 90° is 10.6:1 and the contrast ratio at the point having the azimuth angle $\alpha$ of about 270° is 10.4:1. Additionally, as shown in FIG. 25, when the driving voltage is about 6 V to about 10 V, all the contrast ratios measured at the four points are more than or equal to 10:1. Moreover, when the driving voltage is about 5 V, the contrast ratio at the point having the azimuth angle $\alpha$ of about 270° is 7.4:1. Additionally, as shown in FIG. 26, when the driving voltage is about 8 V to about 10 V, all the contrast ratios measured at the four points are more than or equal to 10:1.

As shown in FIG. 24, when the phase difference Re of the phase direction is about 60 nm and the phase difference Rth in the thickness direction is about 160 nm, the range of the driving voltage having the contrast ratio of more than 10:1 is the widest. Additionally, the contrast ratio at the point having the azimuth angle $\alpha$ of about 90° is similar to that at the point having the azimuth angle $\alpha$ of about 270°, and the contrast ratio at the point having the azimuth angle $\alpha$ of about 0° is similar to that at the point having the azimuth angle $\alpha$ of about 180°. Therefore, a viewing angle is uniform.

FIGS. 27 to 31 are views illustrating a contrast ratio of the liquid crystal display including the biaxial retardation compensation films 210 and 220 having the phase difference Re in the plane direction of about 70 nm. Additionally, FIGS. 27 to 31 are views illustrating a contrast ratio of the liquid crystal display including the biaxial retardation compensation films 210 and 220 having the phase differences Rth in the thickness direction of about 130 nm, about 140 nm, about 150 nm, and about 160 nm, respectively. If the phase difference Rth in the thickness direction is less than about 130 nm, the contrast ratio at the points having predetermined azimuth angles $\alpha$ (especially, about 90°) is less than 10:1. Moreover, if the phase difference Rth in the thickness direction is more than about 170 nm, the contrast ratio at the points having predetermined azimuth angles $\alpha$ (especially, about 270°) is less than 10:1.

Figure 27:
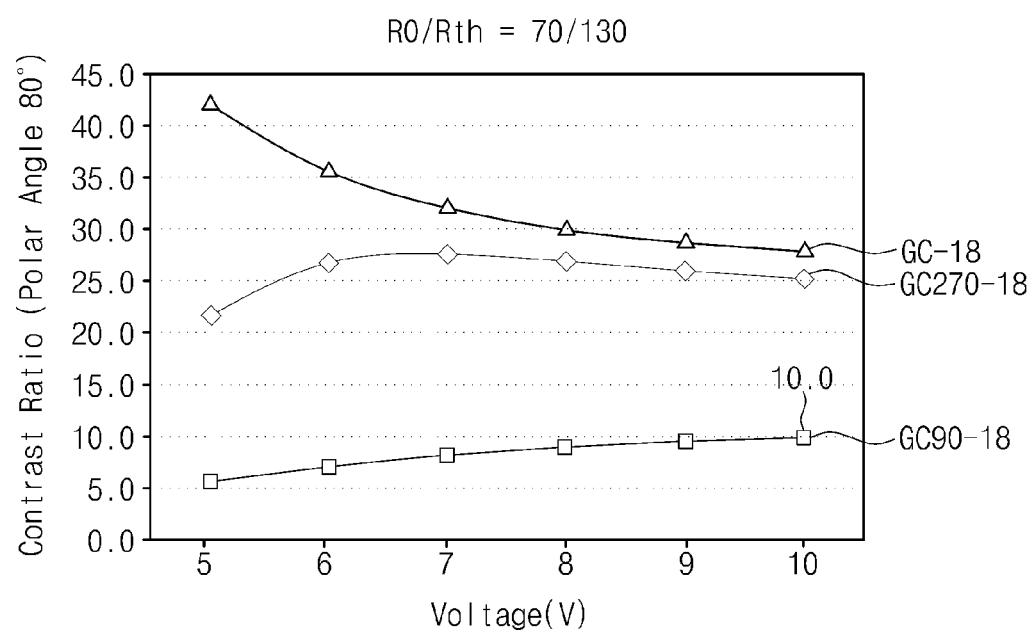
Figure 28:
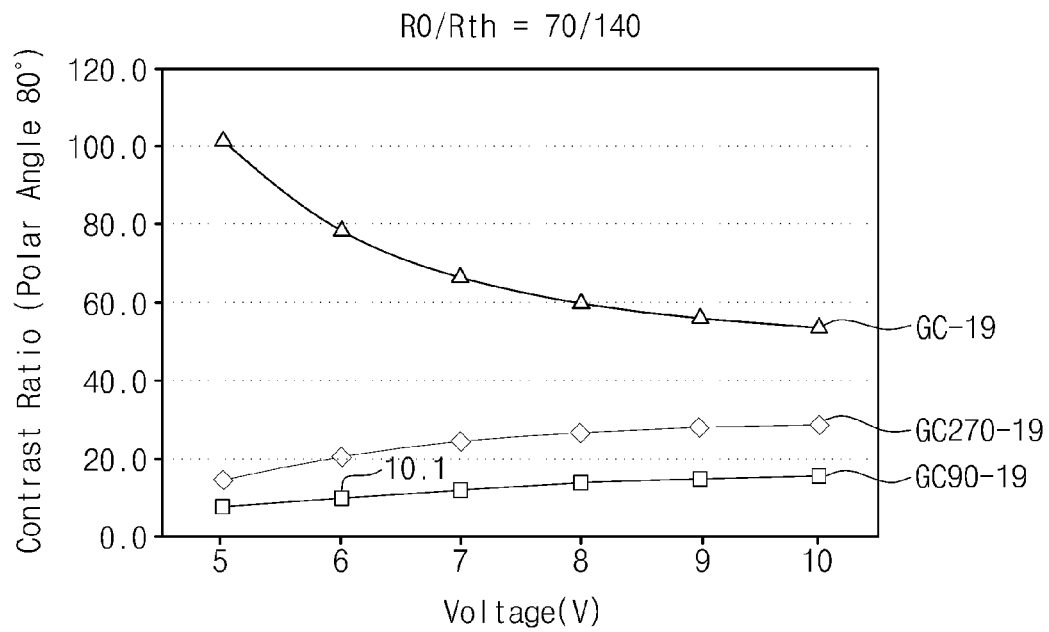
Figure 29:
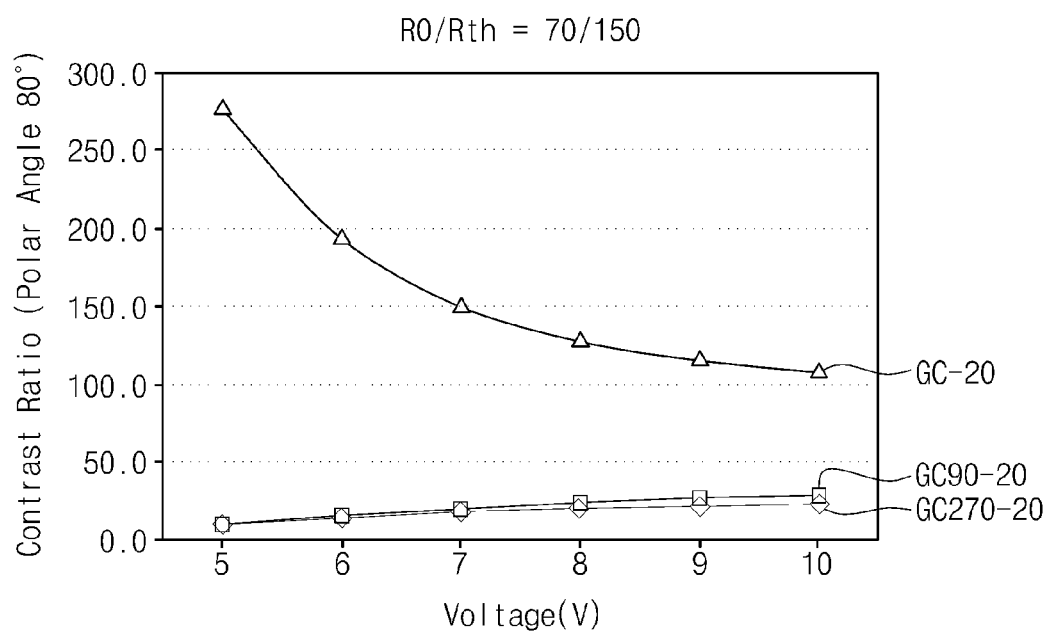
Figure 30:
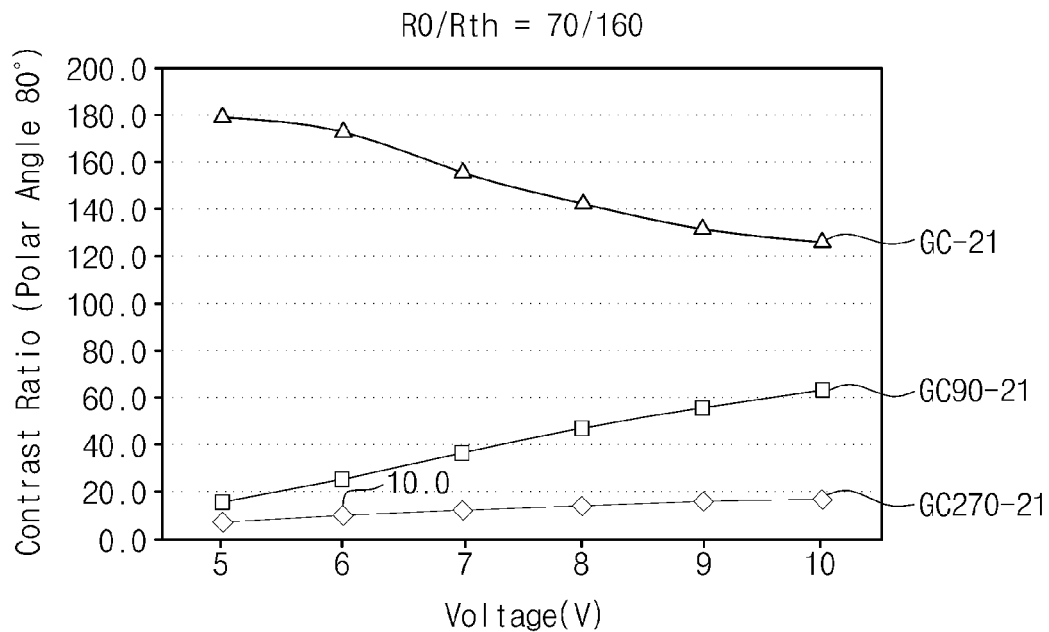
Figure 31:
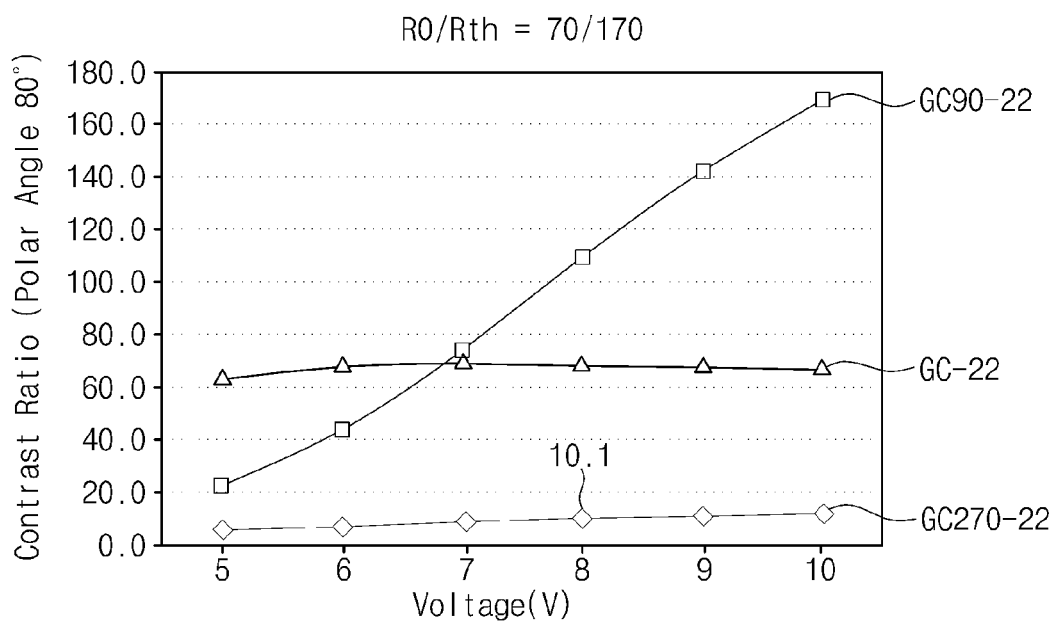

As shown in FIG. 27, when the driving voltage is about 10 V, all the contrast ratios measured at the four points are more than or equal to 10:1. Additionally, as shown in FIG. 28, when the driving voltage is about 6 V to about 10 V, all the contrast ratios measured at the four points are more than or equal to 10:1. Additionally, when the driving voltage is about 5 V, the contrast ratio at the point having the azimuth angle $\alpha$ of about 90° is 7.7:1. Additionally, as shown in FIG. 29, when the driving voltage is about 5 V to about 10 V, all the contrast ratios measured at the four points are more than or equal to 10:1. In more detail, when the driving voltage is about 5 V, the contrast ratio at the point having the azimuth angle $\alpha$ of about 90° is 10.8:1 and the contrast ratio at the point having the azimuth angle $\alpha$ of about 270° is 10.2:1. Additionally, as shown in FIG. 30, when the driving voltage is about 6 V to about 10 V, all the contrast ratios measured at the four points are more than or equal to 10:1. Additionally, as shown in FIG. 31, when the driving voltage is about 8 V to about 10 V, all the contrast ratios measured at the four points are more than or equal to 10:1. Moreover, when the driving voltage is about 7 V, the contrast ratio at the point having the azimuth angle $\alpha$ of about 270° is 8.8:1.

As shown in FIG. 29, when the phase difference Re of the phase direction is about 70 nm and the phase difference Rth in the thickness direction is about 150 nm, it is shown that the range of the driving voltage having the contrast ratio of more than 10:1 is the widest. Additionally, the contrast ratio at the point having the azimuth angle $\alpha$ of about 90° is similar to that at the point having the azimuth angle $\alpha$ of about 270° and the contrast ratio at the point having the azimuth angle $\alpha$ of about 0° is similar to that at the point having the azimuth angle $\alpha$ of about 180°. Therefore, a uniform viewing angle is produced.

Figure 32:
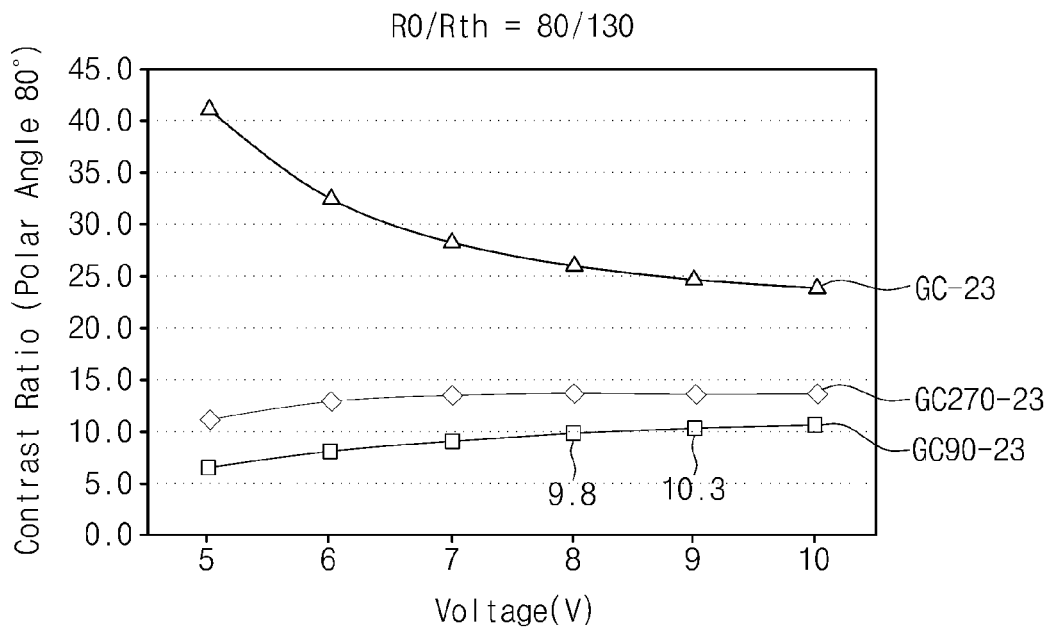
Figure 33:
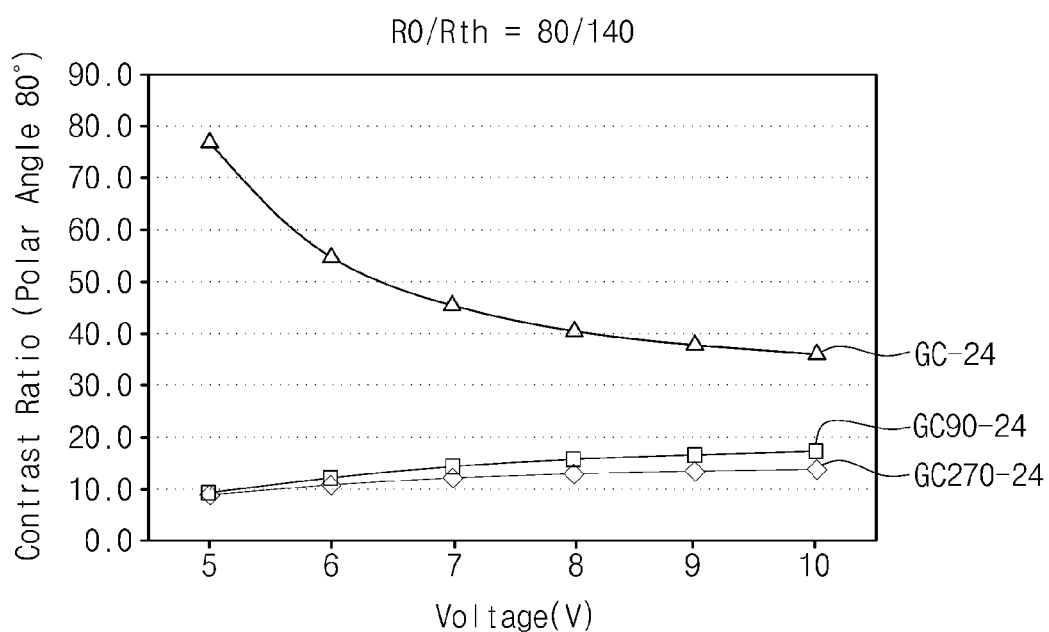
Figure 34:
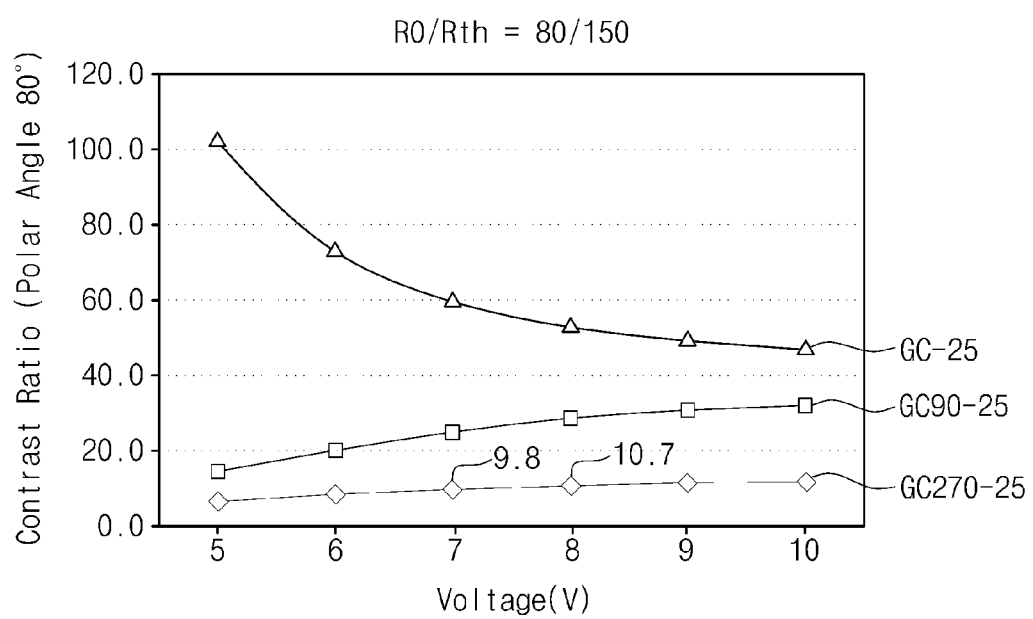

FIGS. 32 to 34 are views illustrating a contrast ratio of the liquid crystal display including the biaxial retardation compensation films 210 and 220 having the phase difference Re in the plane direction of about 80 nm. Additionally, FIGS. 32 to 34 are views illustrating a contrast ratio of the liquid crystal display including the biaxial retardation compensation films 210 and 220 having the phase differences Rth in the thickness direction of about 130 nm, about 140 nm, and about 150 nm. Whenever the phase difference Rth in the thickness direction is less than about 130 nm, the contrast ratio at the points having predetermined azimuth angles α (especially, about 90°) is less than 10:1. Moreover, if the phase difference Rth in the thickness direction is more than about 150 nm, the contrast ratio at the point having a predetermined azimuth angle α (especially, about 270° is less than 10:1.

As shown in FIG. 32, when the driving voltage is about 9 V to about 10 V, all the contrast ratios measured at the four points are more than or equal to 10:1. Additionally, when the driving voltage is about 8 V, the contrast ratio at the point having the azimuth angle α of about 90° is 9.8:1. Additionally, as shown in FIG. 33, when the driving voltage is about 6 V to about 10 V, all the contrast ratios measured at the four points are more than or equal to 10:1. In more detail, when the driving voltage is about 6 V, the contrast ratio at the point having the azimuth angle α of about 90° is 12.2:1 and the contrast ratio at the point having the azimuth angle α of about 270° is 10.7:1. Additionally, as shown in FIG. 34, when the driving voltage is about 8 V to about 10 V, all the contrast ratios measured at the four points are more than or equal to 10:1. Moreover, when the driving voltage is about 7 V, the contrast ratio at the point having the azimuth angle α of about 270° is 9.8:1.

As mentioned above, the liquid crystal display includes the pair of biaxial retardation compensation films arranged with the twisted nematic liquid crystal panel interposed therebetween. Each of the biaxial retardation compensation films has a phase difference Re of about 30 nm to about 80 nm in the plane direction and a phase difference Rth of about 170 nm to about 190 nm in the thickness direction. Accordingly, a horizontal viewing angle is wide and, specifically, a contrast ratio calculated at a predetermined polar angle is improved.

The liquid crystal display may reduce manufacturing costs by replacing a Diamond-Like Carbon (DLC) compensation film with the pair of biaxial retardation compensation films. Furthermore, the pair of biaxial retardation compensation films includes a COP based material to improve durability.

It will be apparent to those skilled in the art that various modifications and variations can be made in the present invention without departing from the true spirit and scope of the invention. Thus, it is intended that the present invention cover the modifications and variations of this invention provided they come within the scope of the appended claims and their equivalents.

What is claimed is:

1. A liquid crystal display comprising:
a liquid crystal panel comprising a first substrate having a first alignment axis, a second substrate facing the first substrate and having a second alignment axis intersecting the first alignment axis, and a plurality of liquid crystal molecules twisted from the first alignment axis to the second alignment axis;
a first biaxial retardation compensation film contacting the first substrate; and
a second biaxial retardation compensation film facing the first biaxial retardation compensation film with the liquid crystal panel arranged therebetween,
wherein each of the first biaxial retardation compensation film and the second biaxial retardation compensation film has a phase difference Re in a plane direction defined by Equation 1 below and a phase difference Rth in a thickness direction defined by Equation 2 below, and the phase difference Re and the phase difference Rth satisfy Equation 3 and Equation 4 below, respectively, $$Re = (nx - ny) \times d \quad \text{[Equation 1]}$$

$$Rth = \{(nx + ny)/2 - nz\} \times d \quad \text{[Equation 2]}$$

$$30 \text{ nm} \leq Re \leq 80 \text{ nm} \quad \text{[Equation 3]}$$

$$130 \text{ nm} \leq Rth \leq 190 \text{ nm} \quad \text{[Equation 4]}$$

wherein:
nx is a refractive index on a plane in a direction indicated by first axes of the first and second biaxial retardation compensation films, ny is a refractive index on a plane in a direction indicated by second axes substantially orthogonal to the first axes, nz is a refractive index in a direction normal to a plane defined by the first and second axes, and d is a thickness of each of the first and second biaxial retardation compensation films in the normal direction; and
the first axis of the first biaxial retardation compensation film is orthogonal to the first alignment axis and the first axis of the second biaxial retardation compensation film is orthogonal to the second alignment axis.

2. The liquid crystal display of claim 1, further comprising:
a first polarizer facing the first biaxial retardation compensation film and having a first transmission axis; and
a second polarizer facing the first polarizer, the first biaxial retardation compensation film, the liquid crystal panel, and the second biaxial retardation compensation film being disposed between the first polarizer and the second polarizer.

3. The liquid crystal display of claim 2, wherein the first transmission axis is substantially parallel to the second transmission axis.

4. The liquid crystal display of claim 2, wherein the first transmission axis is substantially orthogonal to the second transmission axis.

5. The liquid crystal display of claim 4, wherein the first transmission axis is substantially parallel to the first alignment axis.

6. The liquid crystal display of claim 4, wherein the first transmission axis is substantially orthogonal to the first alignment axis.

7. The liquid crystal display of claim 1, wherein the liquid crystal panel is configured to receive a driving voltage of about 5 V to about 10 V.

8. The liquid crystal display of claim 7, wherein whenever the phase difference Re of the first and second biaxial retardation compensation films is about 30 nm, the phase difference Rth of the first and second biaxial retardation compensation film is about 170 nm to about 190 nm, and the driving voltage is about 8 V to about 10 V.

9. The liquid crystal display of claim 7, wherein whenever the phase difference Re of the first and second biaxial retardation compensation films is about 40 nm, the phase difference Rth of the first and second biaxial retardation compensation film is about 160 nm to about 190 nm, and the driving voltage is about 6 V to about 10 V.

10. The liquid crystal display of claim 7, wherein whenever the phase difference Re of the first and second biaxial retardation compensation films is about 50 nm, the phase difference Rth of the first and second biaxial retardation compensation films is about 150 nm to about 190 nm, and the driving voltage is about 6 V to about 10 V.

11. The liquid crystal display of claim 7, wherein whenever the phase difference Re of the first and second biaxial retardation compensation films is about 60 nm, the phase difference Rth of the first and second biaxial retardation compensation films is about 140 nm to about 180 nm.

12. The liquid crystal display of claim 7, wherein whenever the phase difference Re of the first and second biaxial retardation compensation films is about 70 nm, the phase difference Rth of the first and second biaxial retardation compensation films is about 130 nm to about 170 nm.

13. The liquid crystal display of claim 7, wherein whenever the phase difference Re in the plane direction is about 80 nm, the phase difference Rth in the thickness direction is about 130 nm to about 150 nm and the driving voltage is about 6 V to about 10 V in the first biaxial retardation compensation film and the second biaxial retardation compensation film.

14. The liquid crystal display of claim 1, wherein the first biaxial retardation compensation film has the same phase difference Re and the same phase difference Rth as the second biaxial retardation compensation film.

15. The liquid crystal display of claim 1, wherein each of the liquid crystal molecules has a dielectric anisotropy constant of about 10 to about 15.

16. The liquid crystal display of claim 1, wherein each of the first and second biaxial retardation compensation films comprises a cyclo-olefin polymer based material.

17. The liquid crystal display of claim 1, wherein the first substrate comprises a display area and a non-display area adjacent to the display area, and
the display area comprises a plurality of data lines, a plurality of gate lines intersecting the plurality of data lines, and a plurality of pixels, each pixel being connected to one of the data lines and one of the gate lines.

18. The liquid crystal display of claim 17, wherein the second substrate comprises:
a black matrix having openings in areas corresponding to the pixels;
color filters in the respective openings; and
common electrode disposed on the black matrix and the color filters.

* * * * *